United States Patent [19]

Omori et al.

[11] Patent Number: 5,793,341
[45] Date of Patent: Aug. 11, 1998

[54] IMAGE DISPLAY APPARATUS

[75] Inventors: Shigeru Omori; Tomohiko Hattori; Kunimasa Katayama; Sadayuki Sakuma, all of Nakai-machi, Japan

[73] Assignee: Terumo Kabushiki Kaisha, Tokyo, Japan

[21] Appl. No.: 783,410

[22] Filed: Jan. 14, 1997

Related U.S. Application Data

[63] Continuation of Ser. No. 385,042, Feb. 7, 1995, abandoned.

[30] Foreign Application Priority Data

Feb. 7, 1994 [JP] Japan ................... 6-013844

[51] Int. Cl.$^6$ .......................................... G09G 5/00
[52] U.S. Cl. ........................ 345/8; 348/42; 348/51; 348/52; 359/464
[58] Field of Search .................... 345/8; 348/42, 348/51, 52, 57; 359/464

[56] References Cited

U.S. PATENT DOCUMENTS

| | | |
|---|---|---|
| 3,128,339 | 4/1964 | Wupper . |
| 4,535,354 | 8/1985 | Rickert . |
| 4,641,178 | 2/1987 | Street .................... 348/57 |
| 4,987,487 | 1/1991 | Ichinose et al. . |
| 5,032,912 | 7/1991 | Sakariassen . |
| 5,132,839 | 7/1992 | Travis . |
| 5,315,377 | 5/1994 | Isono et al. . |
| 5,365,370 | 11/1994 | Hudgins . |
| 5,408,264 | 4/1995 | Kurata et al. . |
| 5,421,589 | 6/1995 | Monroe . |
| 5,430,474 | 7/1995 | Hines . |
| 5,430,809 | 7/1995 | Tomitaka . |
| 5,457,574 | 10/1995 | Eichenlaub . |
| 5,459,605 | 10/1995 | Kempf . |
| 5,494,483 | 2/1996 | Adair . |
| 5,499,303 | 3/1996 | Hundt et al. . |
| 5,568,314 | 10/1996 | Omori et al. . |

*Primary Examiner*—Richard A. Hjerpe
*Assistant Examiner*—Kent Chang
*Attorney, Agent, or Firm*—Burns, Doane, Swecker & Mathis, LLP

[57] ABSTRACT

Screen images for the right eye are displayed upside down on an image display device 10a, and screen images for the left eye are displayed inverted upside down and right-to-left on an image display device 10b. Light of the screen images for the right eye and for the left eye are polarized so that polarization directions of the light for the right eye and for the left eye are perpendicular to each other. Right half images of viewers' faces, picked up by an image sensing device 14, are displayed on liquid crystal display elements 11. The displayed images functions as light transmission images, and by observing them through a lens 11 having directivity characteristics, the screen images for the right eye and screen images for the left eye of images combined by a half mirror 15 are respectively seen by the right and the left eyes of the viewers.

18 Claims, 30 Drawing Sheets

F I G. 30
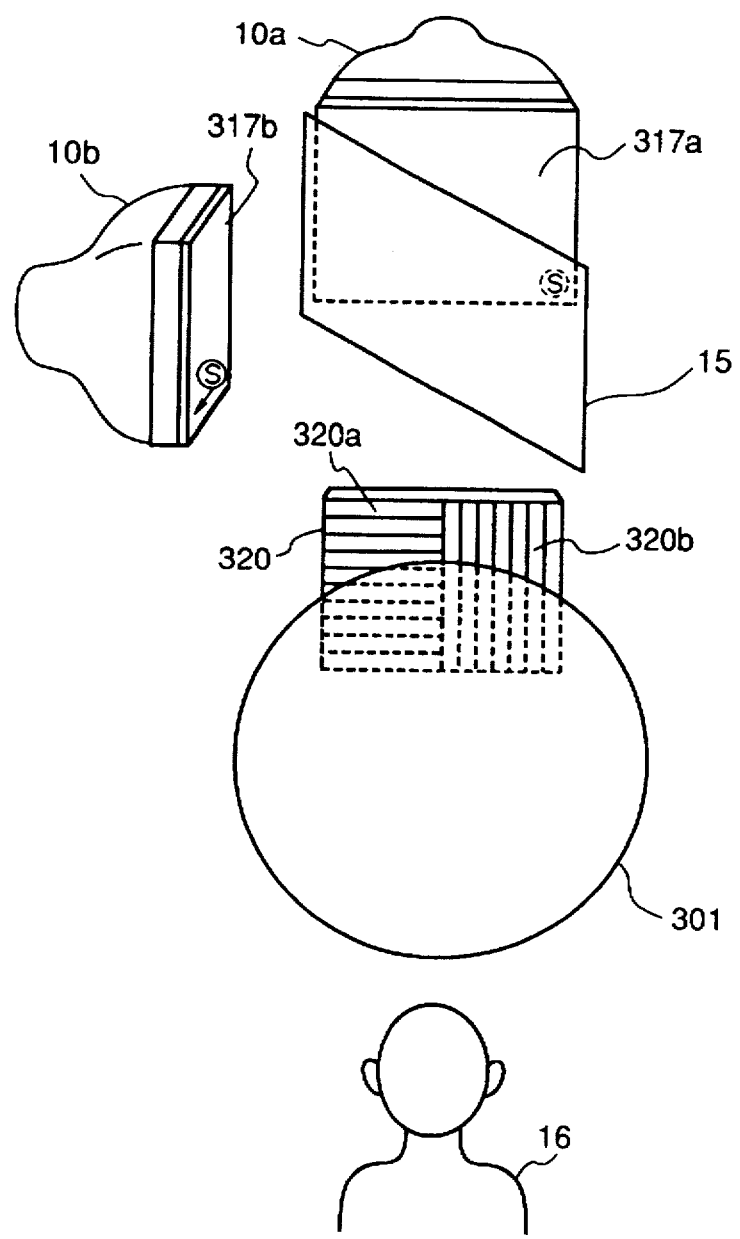

IMAGE DISPLAY APPARATUS

This application is a continuation of application Ser. No. 08/385,042, filed Feb. 7, 1995 is now abandoned.

BACKGROUND OF THE INVENTION

The present invention relates to a display apparatus for displaying an image and, more particularly, to a display apparatus for displaying a stereoscopic image for industrial, domestic, and medical uses.

In a conventional stereoscopic display system, a viewer wears glasses for separating right and left images from each other whereby right and left eyes of the viewer can selectively see right and left screen images, respectively, which are displayed on an image field in a time-division fashion. In another conventional technique, a lenticular plate is attached to an image field screen so that the lenticular plate can separate right and left images from each other and thus right and left eyes of the viewer can selectively see right and left screen images, respectively.

FIG. 1 illustrates an example of the configuration of the above-described conventional stereoscopic-image display system, which includes glasses 60 capable of separating right and left images from each other, liquid crystal shutters 61a and 61b, a synchronous circuit 62, and color CRT 63 serving as an image display device.

The above first example of a stereoscopic-image display system having such a configuration operates as follows. The color CRT 63 displays stereoscopic images wherein screen images for right and left eyes are displayed alternately in a time-division fashion. Under the control of the synchronous circuit 62, the liquid crystal shutter 61a of the glasses 60 is opened and thus become transparent only when screen images for the right eye are displayed, and the liquid crystal shutter 61b is opened and become transparent only when screen images for the left eye are displayed. As a result, a viewer wearing the glasses 60 can observe screen images for the right eye with his or her right eye, and screen images for the left eye with the left eye. In this way, stereoscopic vision is provided.

FIG. 2 illustrates the configuration of the second example of a conventional stereoscopic-image display system, which includes a lenticular plate 71 having a large number of cylindrical lenses touching each other in parallel and a color CRT 72 serving as an image display device.

This second example of stereoscopic-image display system having such a configuration operates as follows. The color CRT 72 simultaneously displays both screen images for right and left eyes such that screen images for right and left eyes having radius-width of each cylindrical lens (slit-shaped) are displayed alternately on arbitrary positions in each cylindrical lens of the lenticular plate 71. The right eye of a viewer sees only the screen images for the right eye displayed on the above-described slit-shaped zones through each cylindrical lens of the lenticular plate 71, and the left eye sees only the screen images for the left eye displayed on the slit-shaped zones, whereby stereoscopic vision is obtained.

In the first example of the conventional stereoscopic-image display system, however, a viewer has to wear troublesome and uncomfortable glasses which separately provide screen images to right and left eyes of the viewer. Another problem in observing stereoscopic images using this technique is flicker due to the switching between the screen images for right and left eyes.

In the second example of the conventional stereoscopic-image display system, since a stripe-shaped stereoscopic image is observed via cylindrical lenses, stereoscopic vision can be obtained only when a viewer is in a limited narrow area. If the viewer moves, degradation occurs in the image. Besides, many viewers at various positions can not observe an image at the same time. Furthermore, image processing is necessary to provide a stripe-shaped image, thus requiring an expensive apparatus.

In medical applications, when an endoscopic operation is done, an operator usually observes a plane image of the inside of a patient's abdominal cavity displayed on a monitor via an endoscope. In which case, the monitored image of the inside of the abdominal cavity has little characteristic features because the entire abdominal cavity is displayed in a single color, thus it is difficult to give perspective vision. This causes a long operation time, and causes heavy loads to both operator and patient. As described above, when a conventional stereoscopic-image display system of the above-described first or second type is used in the operation, there are serious problems in practical use such as uncomfortable glasses for separating right and left images, flicker of an image, and limitation in movement of a viewer.

SUMMARY OF THE INVENTION

The object of the present invention is to provide an image display apparatus capable of displaying two images which are seen without glasses for separating screen images for the right eye from a screen image for the left eye, and which can be seen by many viewers without flicker.

The aforesaid object is achieved by providing an image display apparatus comprising:

first image display means for displaying a first image by irradiating light polarized in a first direction;

second image display means for displaying a second image by irradiating light polarized in a second direction which is different from the first direction;

combining means for combining the first image and the second image;

transmission control means, provided between the combining means and a viewer, for controlling the polarized light to be transmitted; and an optical element, provided between the transmission control means and the viewer, for giving the transmitted light directivity, wherein the transmission control means has two areas which separately transmit the polarized light of the first image and the polarized light of the second image.

The two areas in the transmission control means separately transmit the polarized light of the first image and the polarized light of the second image. As a result, the viewer sees the first image through one of the two areas in the transmission control means and sees the second image through the other area. In this case, the optical element gives directivity to the transmitted light, thus a right eye of the viewer observes the first image through one of the aforesaid two areas and a left eye observes the second image through the other area.

According to an aspect of the present invention as described above, the first direction and the second direction are perpendicular to each other.

Further, according to an aspect of the present invention as described above, the transmission control means includes:

a transmission type display device capable of displaying an image; and a polarizing plate, provided on one side of the display device which transmits either the first polarized light or the second polarized light.

Furthermore, according to an aspect of the present invention as described above, the transmission type display device is a mono-chromatic transmission type liquid crystal display device which transmits either one of the first or the second polarized light when a voltage is applied to the display device, whereas transmits the other polarized light when a voltage is not applied. In a state where a voltage is applied, either one of the first or second polarized light whose polarized direction matches to the polarized direction of the polarizing plate is transmitted through the polarizing plate, whereas in a state where no voltage is applied, the other polarized light whose polarization direction matches to the polarization direction of the polarizing plate is transmitted through the polarizing plate.

Further, according to an aspect of the present invention as described above, the transmission type display device has the two areas as two display areas on its display, and the two display areas are provided so that each display area corresponds to right side and left side of the viewer's face.

Further, according to an aspect of the present invention as described above, the image display apparatus further comprises an image sensing device for picking up an image of the viewer, wherein the image sensing device takes an image of either right or left side of the viewer's face and the picked-up image is displayed on the transmission type display device. When the picked-up side of the face by the image sensing device is displayed on the transmission type display device, movement of the viewer corresponds to the movement of the position of the viewer's face in the transmission type display device, thereby an image which is independent of the position of the viewer can be observed.

Further, according to an aspect of the present invention as described above, the image display apparatus further comprises an image sensing device for picking up an image of the viewer, wherein the image sensing device picks up images of either right or left side of the viewer's face, and in the area where the picked-up part of the face is displayed on the transmission type display device, a figure through which area either the first or second polarized light transmits is displayed. The movement of the viewer corresponds to the movement of the position of the figure displayed on the transmission type display device.

Further, according to an aspect of the present invention as described above, the image display apparatus further comprises a detecting device for detecting a position of the viewer, wherein a figure which transmits either the first or the second polarized light is displayed on the display of the transmission type display device at the position of either the right or the left side of the viewer's face detected by the detecting device. The movement of the viewer corresponds to the movement of the position of the figure displayed on the transmission type display device.

Further, according to an aspect of the present invention as described above, the image display apparatus further comprises an irradiation device for irradiating infrared, wherein the image sensing device can selectively pick up images in correspondence with a wavelength of the infrared from the irradiation device. Thereby, the viewer can pick up an image with little noise.

Further, according to an aspect of the present invention as described above, the combining means is a half mirror.

Further, according to an aspect of the present invention as described above, the combining means is a screen upon which an image is irradiated from the first image display means and the second image display means.

Further, according to an aspect of the present invention as described above, the optical element is either a lens or a concave mirror. The two areas in the display device are considered as virtual images magnified to the maximum valid diameter of the lens or the concave mirror.

Further, according to an aspect of the present invention as described above, the display of the monochromatic transmission type liquid crystal display device is provided beyond a focal distance of the optical element.

Further, according to an aspect of the present invention as described above, the optical element expands the area, to be seen by the viewer's right eye, corresponding to the right side of the viewer's face in the transmission control means, likewise, expands the area, to be seen by the viewer's left eye, corresponding to the left side of the viewer's face in the transmission control means.

Further, according to an aspect of the present invention as described above, the image display apparatus further comprises a pair of lens mirrors for picking up an object to be seen as a stereoscopic image from the two different directions and a pair of endoscopic barrels having a pair of image sensing elements for converting the pair of object's image into electrical signals, wherein the images picked up by the image sensing elements are displayed on the first and second image display means.

Further, according to an aspect of the present invention as described above, the detecting device uses ultrasonic having one or more different frequencies to detect the position of the viewer.

Further, according to an aspect of the present invention as described above, the image sensing device is fixed on the head of the viewer.

Further objects, features and advantages of the present invention will become apparent from the following detailed description of embodiments of the present invention with reference to the accompanying drawings.

BRIEF DESCRIPTION OF THE DRAWINGS

FIG. 30 illustrates a configuration of an image display device according to the twelfth embodiment of the present invention.

DESCRIPTION OF THE PREFERRED EMBODIMENTS

<First Embodiment>

Figure 1:
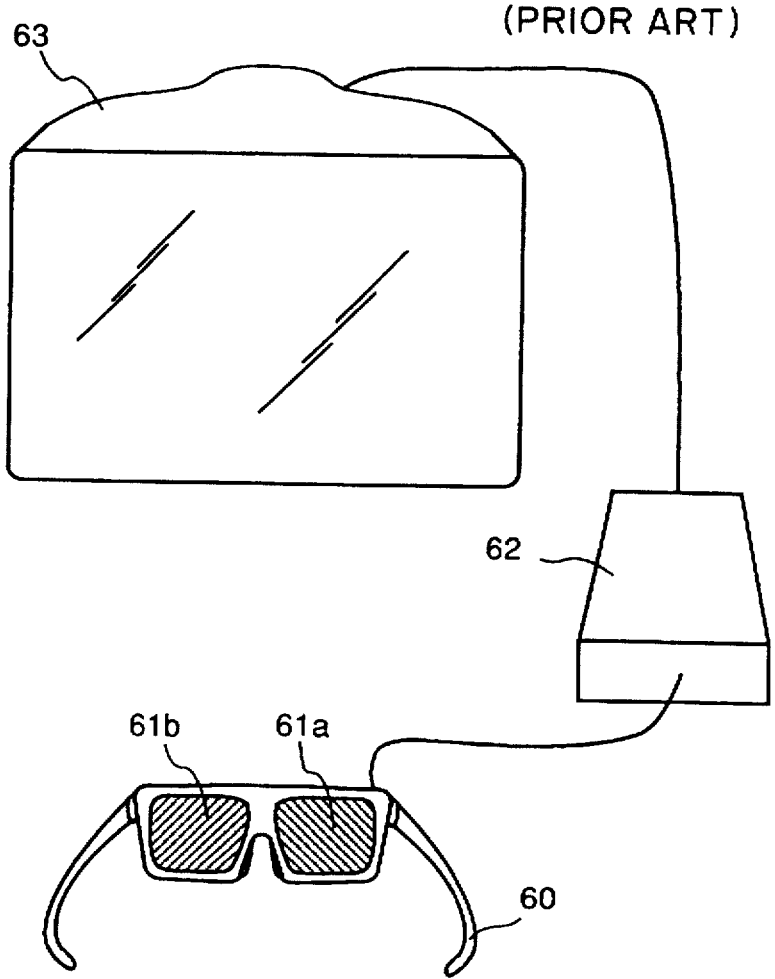
FIG. 1 illustrates a configuration of a conventional stereoscopic image display apparatus according to a first example.
Figure 2:
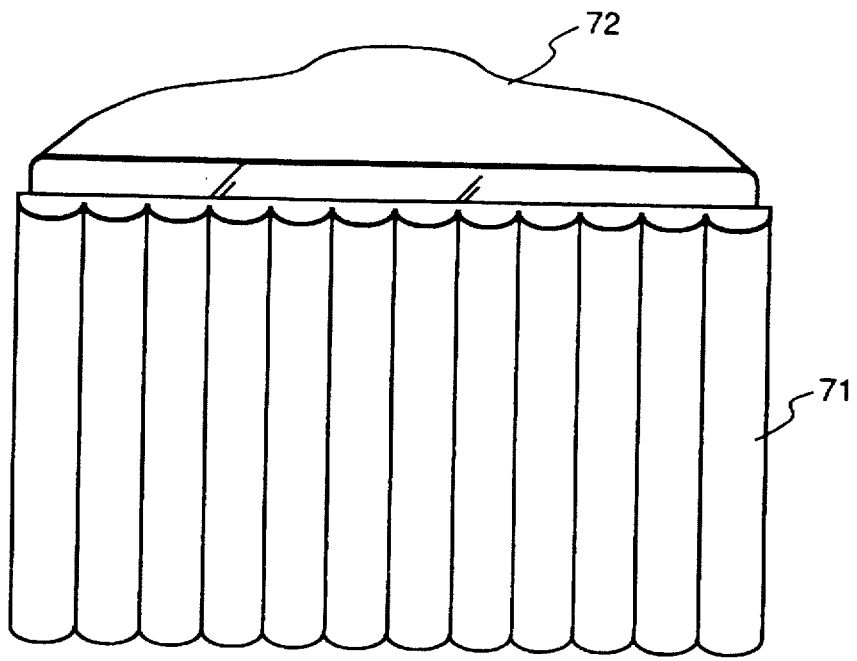
FIG. 2 illustrates a configuration of a conventional stereoscopic image display apparatus according to a second example.
Figure 3:
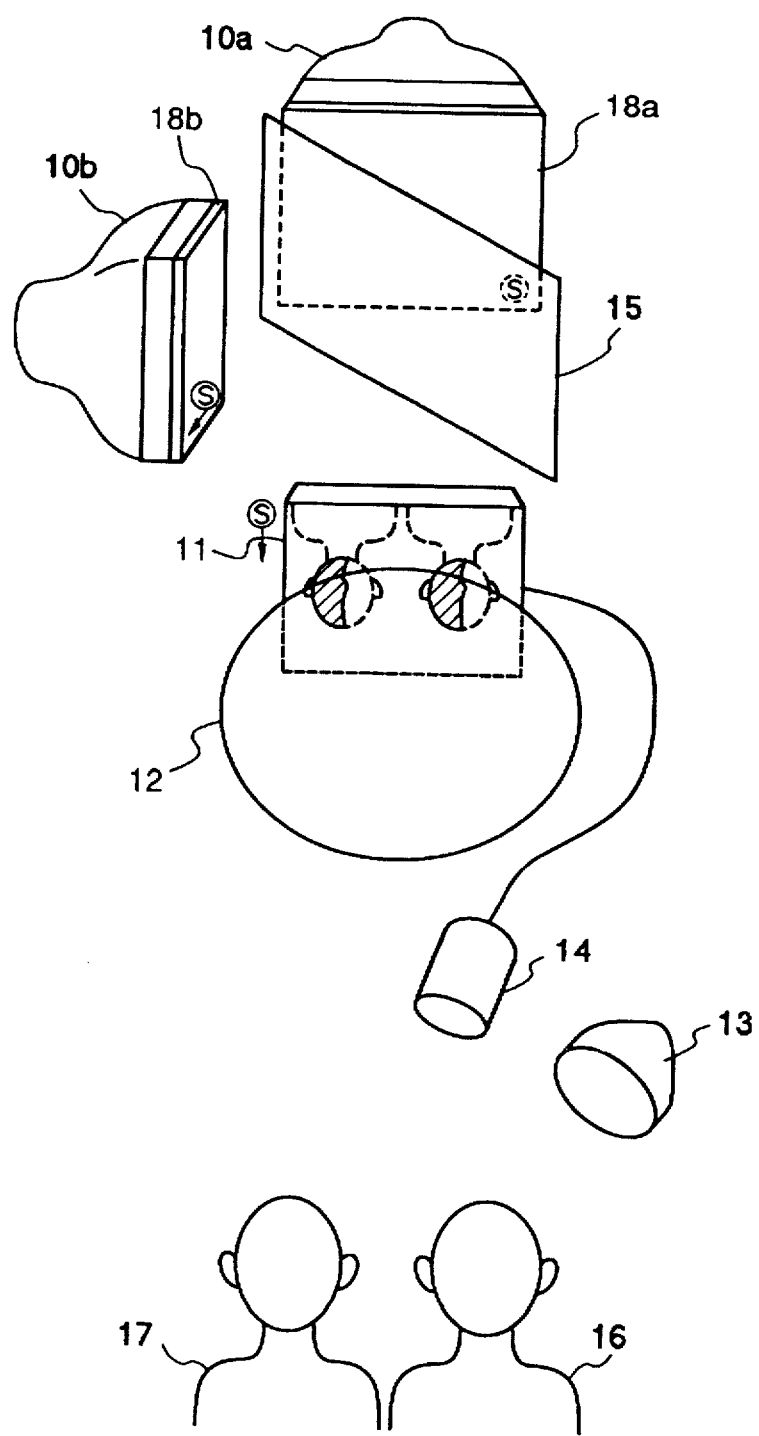
FIG. 3 illustrates a configuration of a stereoscopic image display apparatus according to a first embodiment of the present invention.

FIG. 3 illustrates a configuration of a stereoscopic image display apparatus according to a first embodiment of the present invention.

The apparatus according to the first embodiment comprises a plurality of displays. The displays are set "normally" unless otherwise specified. It is meant by "normally" that a luster scan starts at an upper left point of the display screen of the "normally" set display when it is set upright. If a display is set with the screen surface placed horizontally, a luster scan starts at an upper left point (from the view point of viewer) of the screen surface of the "normally" set display. In the figures, arrows "→" and indicators "(s)" are used to describe another method of setting the displays, which will be described later.

In FIG. 3, reference numerals 10a and 10b denote color CRTs, and reference numerals 18a and 18b denote polarizing plates attached to displays of the color CRTs 10a and 10b, respectively. The polarizing plates 18a and 18b are provided so that polarization directions of the plates are perpendicular to each other. Further, reference numeral 15 denotes a half mirror for combining images displayed on the color CRTs 10a and 10b; 11, a mono-chromatic transmission type liquid crystal display as a spatial modulation element; 12, a Fresnel lens having a focal distance of 240 mm. The Fresnel lens is placed at a position beyond the focal distance of the lens 12 from the transmission type liquid crystal display 11, 280 mm, for instance. Further, reference numeral 13 denotes a LED which emits light having wavelength of 850 nm as an irradiation device; 14, a monochrome CCD camera as an image sensing device; 16 and 17 are viewers seeing a stereoscopic image.

In the present specification, an objective image which are seen by the right or left eye of viewer for stereoscopic vision are referred to as "screen image". Therefore, "screen images" are not limited to images which are displayed on a screen, they encompasses images on films.

Figure 4:
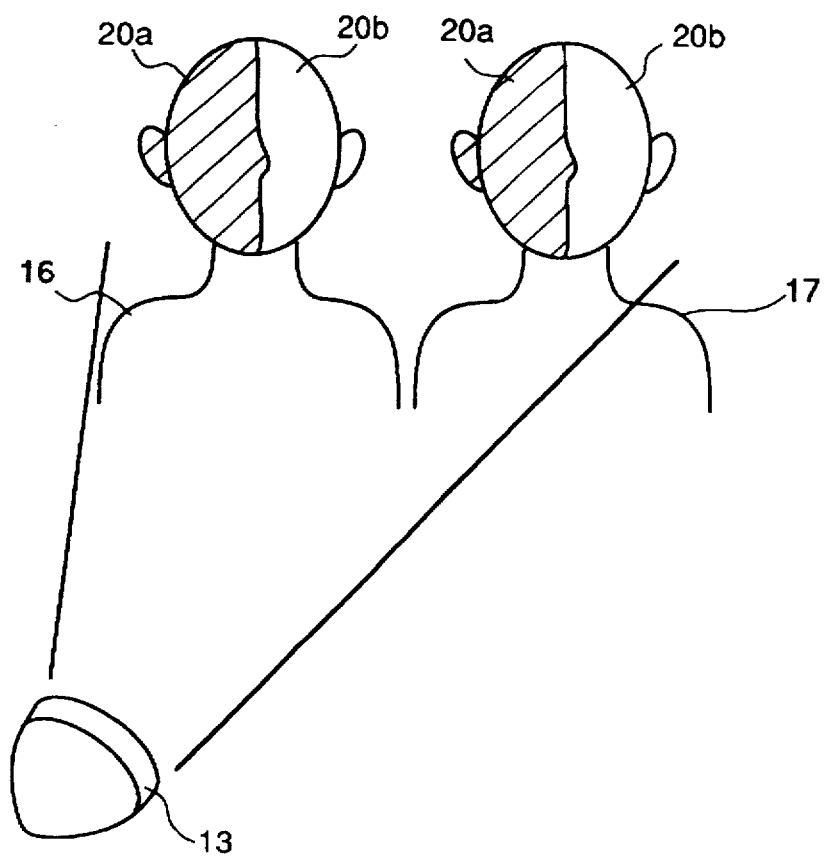
FIG. 4 illustrates an explanatory view of operation of the stereoscopic image display apparatus according to the first embodiment of the present invention.

FIG. 4 is a diagram of illuminating the right side of the faces of the viewers 16 and 17 by the LED 13. In FIG. 4, two areas 20a indicated by oblique stripe pattern are the part of the faces, illuminated by the light from the LED 13, of the viewers 16 and 17, whereas, the areas 20b indicates the parts which are not illuminated by the light from the LED 13.

Figure 5:
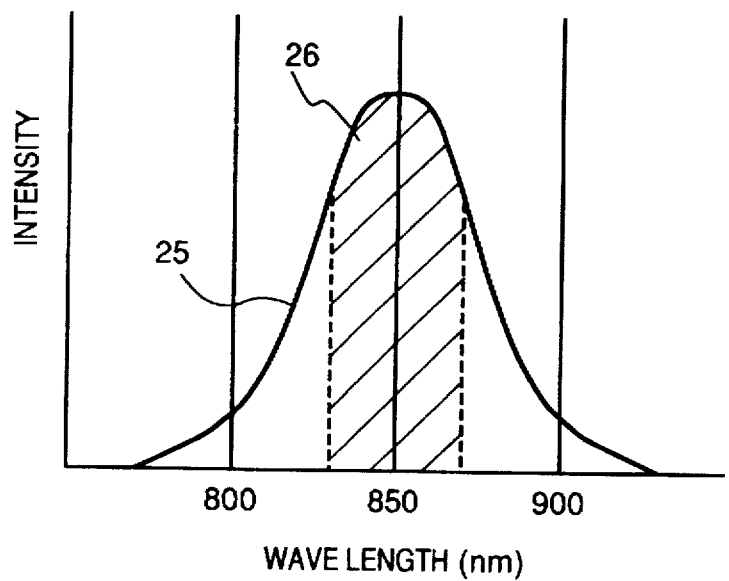
FIG. 5 illustrates a graph illustrating characteristics in wavelength distribution of emitted light used by the stereoscopic image display apparatus according to the first embodiment of the present invention.

FIG. 5 is a graph showing characteristics in wavelength distribution of emitted light from the LED 13. In FIG. 5, a curve 25 indicates the wavelength distribution of the LED 13, and a hatched area 26 indicates a wavelength range of light to be selectively transmitted through a wavelength filter attached to the monochrome CCD camera 14.

Figure 6:
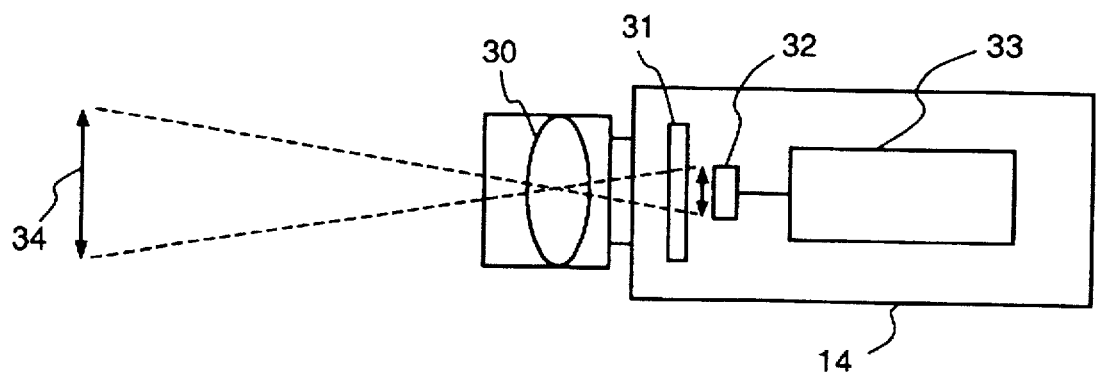
FIG. 6 illustrates a cross sectional view of an image sensing device included in the stereoscopic image display apparatus according to the first embodiment of the present invention.

FIG. 6 is a cross sectional view of the monochrome CCD camera 14, and reference numeral 30 denotes an object lens; 31, an interference filter as a wavelength filter; 34, an object which is faces of viewers 16 and 17 in the embodiment.

Figure 7:
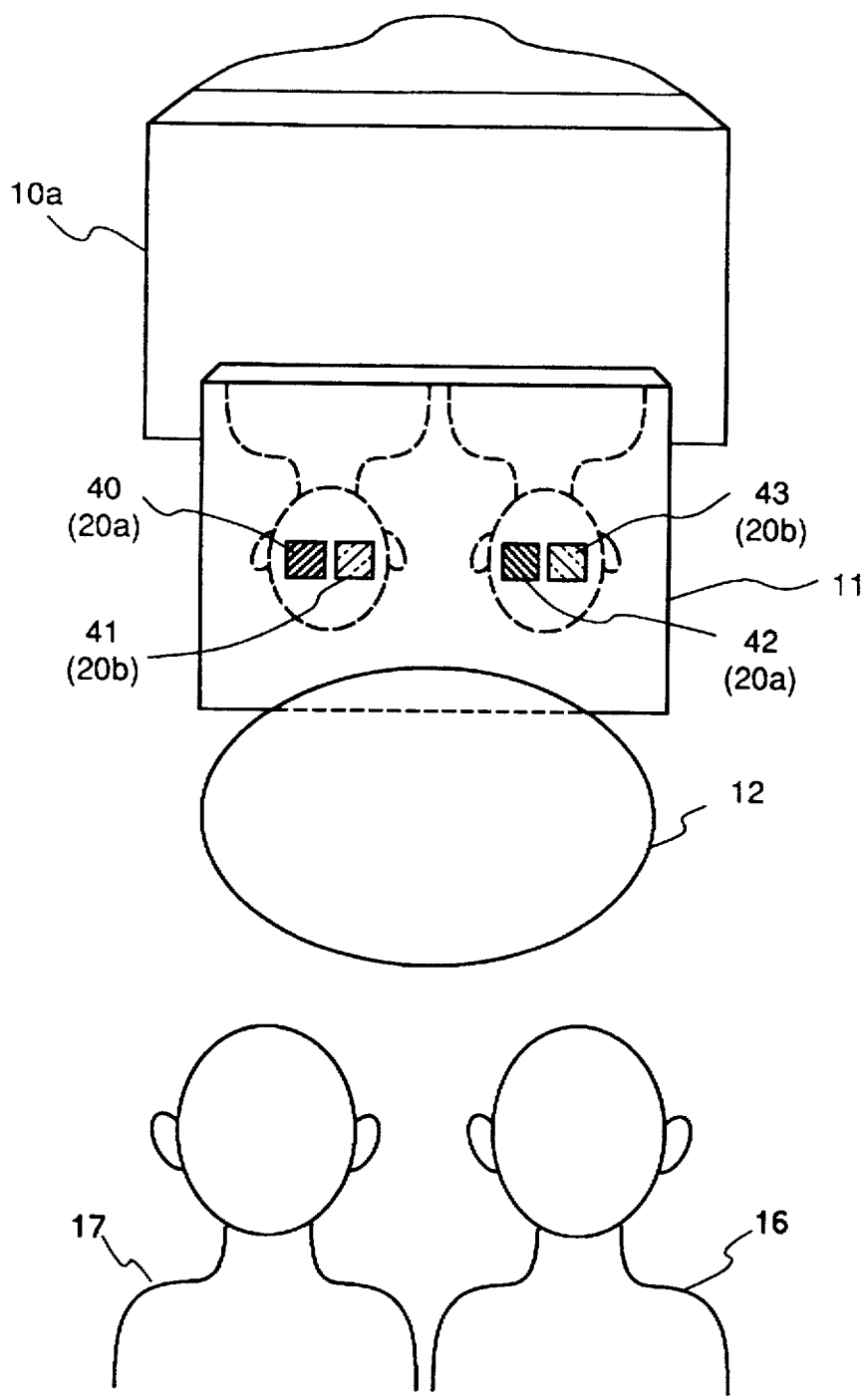
FIG. 7 illustrates an explanatory view of operation of the stereoscopic image display apparatus according to the first embodiment of the present invention.

FIG. 7 is an explanatory view for the viewers of observing an image of their own in the embodiment shown in FIG. 3.

In FIG. 7, for the sake of simplicity, only the color CRT 10a, the liquid crystal display 11, and the lens 12 are shown, but the half mirror 15 is not shown. Areas 40, 41, 42, and 43 displayed on the liquid crystal display 11a in FIG. 7 denote areas which the viewers 16 and 17 see in practice.

Figure 8:
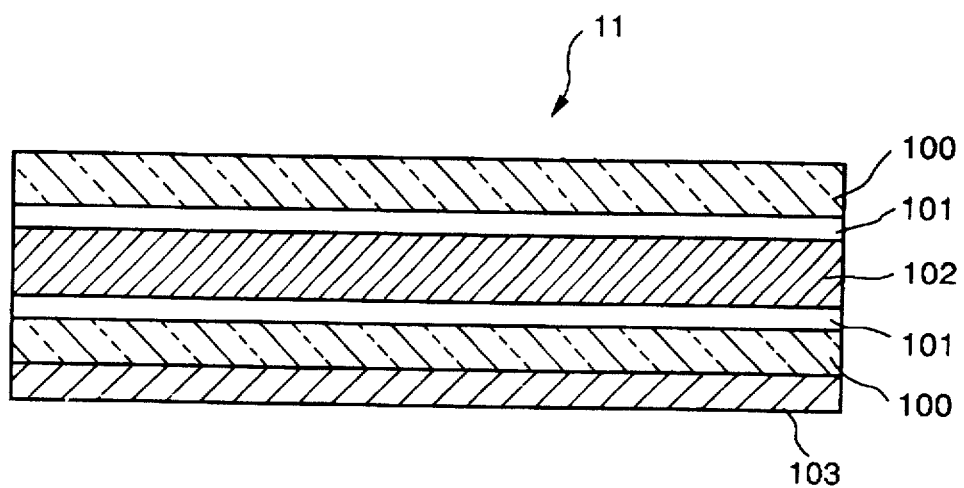
FIG. 8 illustrates a cross sectional view of the main portion of a liquid crystal display element included in the stereoscopic image display apparatus according to the first embodiment of the present invention.

FIG. 8 shows a cross sectional view of the transmission type liquid crystal display 11, wherein reference numeral 100 denotes a glass substrate; 101, a transparent electrode; 102, liquid crystal; and 103, a polarizing plate.

Figure 9:
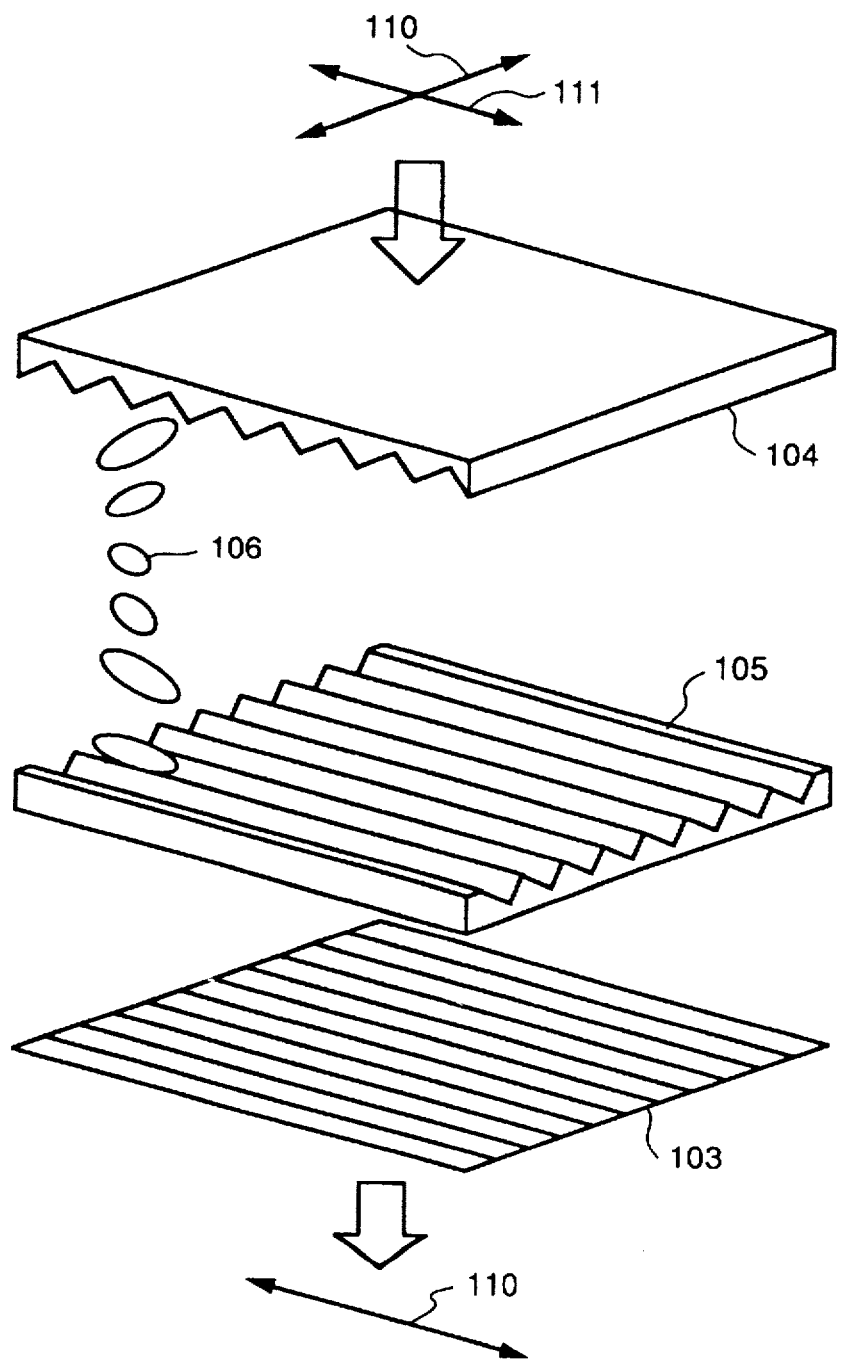
FIG. 9 illustrates an explanatory view of operation of the liquid crystal display element included in the stereoscopic image display apparatus according to the first embodiment of the present invention.
Figure 10:
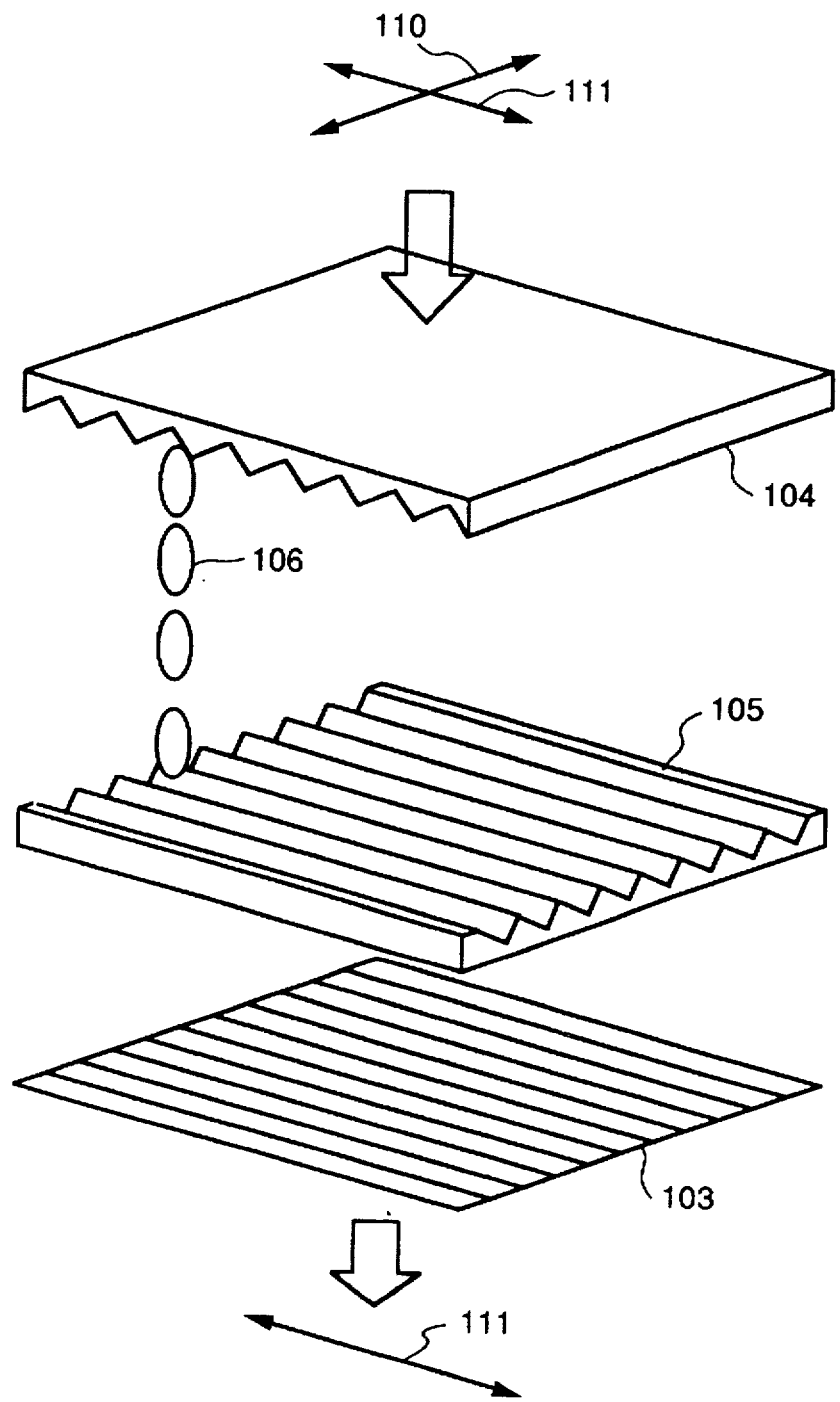
FIG. 10 illustrates an explanatory view of operation of the liquid crystal display element included in the stereoscopic image display apparatus according to the first embodiment of the present invention.

FIGS. 9 and 10 respectively show transmission of polarized light when no voltage is applied to the liquid crystal and when a voltage is applied to the liquid crystal of the transmission type liquid crystal display 11 shown in FIG. 8. In FIGS. 9, 10, reference numerals 104 and 105 denote deflecting layers; 106, a molecule of liquid crystal; 103, a polarizing plate; and 110 and 111, incoming polarized light whose polarization directions are perpendicular to each other.

The configuration and operation of the transmission type liquid crystal display 11 will be explained with reference to FIGS. 8 to 10. As shown in FIG. 8, the orientation of the liquid crystal 102 provided between two glass plates 100 is controlled its orientation by applying a voltage on a transparent electrodes 101. Further, a polarizing plate 103 is attached on either one side of the above-described layered plate. In a state where a voltage is not applied, as shown in FIG. 9, incoming polarized light 110 rotates its polarization direction by 90 degrees in accordance with the orientation of molecules of liquid crystal, thereby being transmitted through the polarizing plate 103 since the polarization direction of the incoming light matches to the polarization characteristics of the polarizing plate 103. On the other hand, incoming polarized light 111 is not transmitted through the polarizing plate 103 since the polarization direction of the incoming light makes right angle with the orientation of the molecules of liquid crystal 106. Further, in a state where a voltage is applied, as shown in FIG. 10, the molecules of liquid crystal 106 are oriented in the direction of the applied voltage, thus the incoming light is transmitted through the layer of the liquid crystal 102 regardless of polarization direction. However, the incoming polarized light 110 is not transmitted through the polarizing plate 103, whereas, the incoming polarized light 111 is transmitted through it, since the polarization direction of the polarized light 111 matches to the direction of the polarization characteristics of the polarizing plate 103. Therefore, by using the aforementioned transmission type liquid crystal display 11, it is possible for a portion, applied with a voltage, of the liquid crystal display 11 to transmit one of two kinds of the polarized light whose polarization directions are perpendicular to each other, and for a portion, applied with no voltage, to transmit the other polarized light. The light which can be transmitted through the portion where a voltage is applied is called "X polarized light" (light polarized in the X direction), and the light which can transmit the portion where no voltage is applied is called "Y polarized light" (light polarized in the Y direction), hereinafter.

The operation of the stereoscopic image display apparatus as described above will be explained with reference to FIGS. 3 to 13.

The screen images for the right eye (referred as "R screen images", hereinafter) is turned upside down, therefore it is inverted right-to-left, and input to the CRT 10a for display. The screen images for the left eye (referred as "L screen images", hereinafter) is turned upside down and converted into reflected image, and then input to the CRT 10b for display. The R screen image and the L screen image are combined by using the half mirror 15 to produce a single stereoscopic image.

Further, as shown in FIG. 4, the LED 13 is provided in the oblique forward direction so that it irradiates areas 20a which are the right sides of the faces of the viewers 16 and 17. As shown in FIG. 5, intensity of the emitted light from the LED 13 has a peak at a wavelength of about 850 nm and distributed to plus or minus 25 nm. In the CCD camera 14, as shown in FIG. 6, the interference filter 31 which transmits light having wavelengths of 850±20 nm is provided between the image sensing element 32 and the image sensing lens 30, thus when an image of the object 34 is focused on the image sensing element 32, the portion which is illuminated by light of the wavelength in range 26 in FIG. 5 is preserved as an image.

Figure 11:
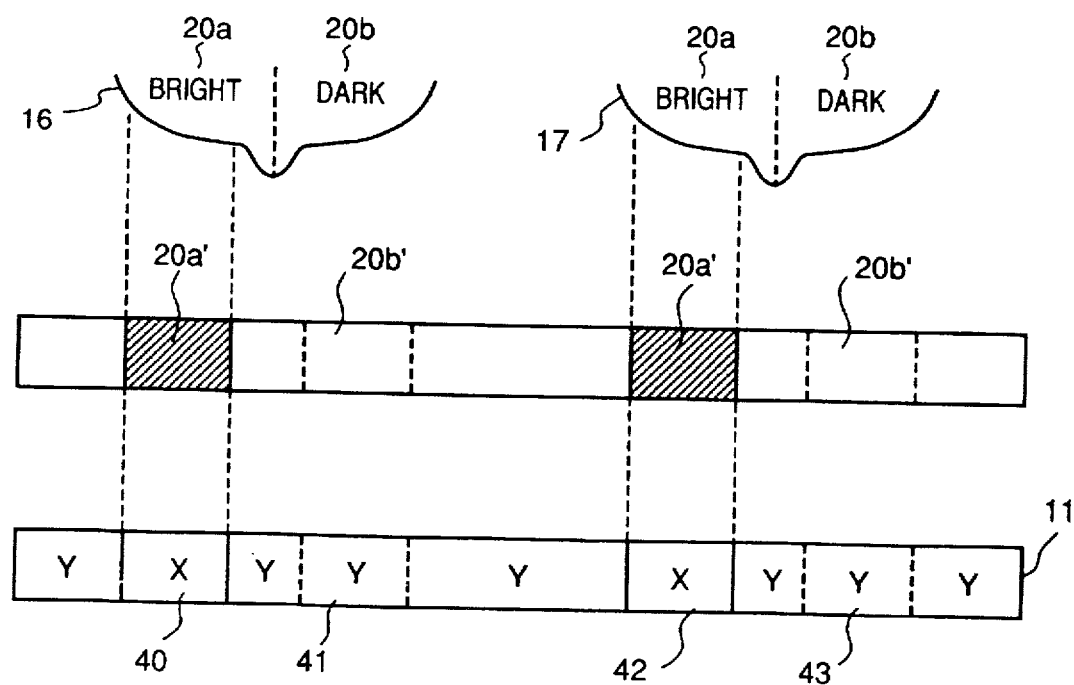
FIG. 11 illustrates an explanatory view of a method of forming a transmitting light control image according to the first embodiment of the present invention.

Therefore, according to the above-described configuration, as shown in FIG. 11, the CCD camera 14 picks up areas 20a, 20a which include right eyes of the viewer 16 and 17, and images of these areas 20a, 20a (corresponds to images 20a' and 20a' in FIG. 11) are displayed on the liquid crystal display 11 as images 40 and 42. It should be noted that contrast of the liquid crystal display 11 and iris diaphragm of the CCD camera 14 should be adjusted so that the areas 20a' displaying the faces and other areas 20b' have the clearest contrast between each other. Further, as seen in FIG. 11, the liquid crystal display 11 should be set so that the image areas 40 and 42 on the liquid crystal display 11 corresponding to the images 20a' in the illuminated areas 20a (in other words, the areas where molecules of liquid crystal are applied with a voltage) transmit X polarized light, whereas the image areas 41 and 43 on the liquid crystal display 11 corresponding to the images 20b' in the non-illuminated areas 20b (in other words, the areas where molecules of liquid crystal are not applied with a voltage) transmit Y polarized light. Regarding the liquid crystal display 11 which is set as above, only the X polarized light is transmitted through the areas 40 and 42, and only Y polarized light is transmitted through the other areas.

For the sake of simplicity, the areas 40, 41, 42, and 43, obtained from the image of viewers' faces are referred as "transmitting light control images" or "transmitting light control figures", since the area controls transmission of light.

Next, function of the polarizing plates 18a and 18b will be described. The polarizing plate 18a transmits light, polarized in the X direction, emitted from the color CRT 10a. The polarizing plate 18b transmits light, polarized in the Y direction, emitted from the color CRT 10b. Therefore, the light of image which is transmitted through the polarizing plate 18a is a X polarized R screen image (further turned upside-down), and the light of image which is transmitted through the polarizing plate 18b is a Y polarized L screen image (further turned upside-down and converted into-reflected image).

Figure 12:
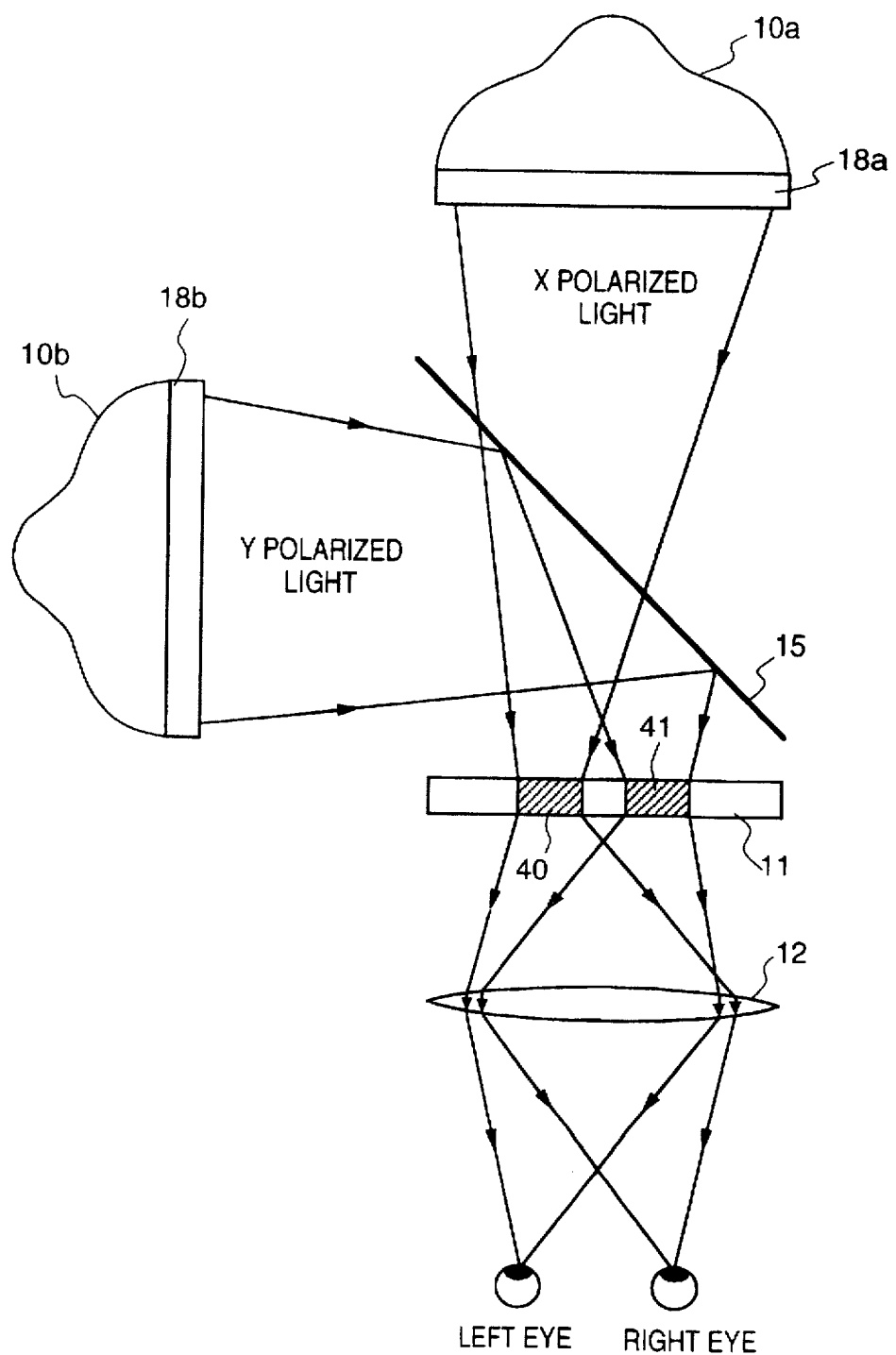
FIG. 12 illustrates a diagram illustrating light paths of screen images for the right eye and for the left eye from when the light is emitted until it reaches to the corresponding eyes according to the first embodiment.
Figure 13:
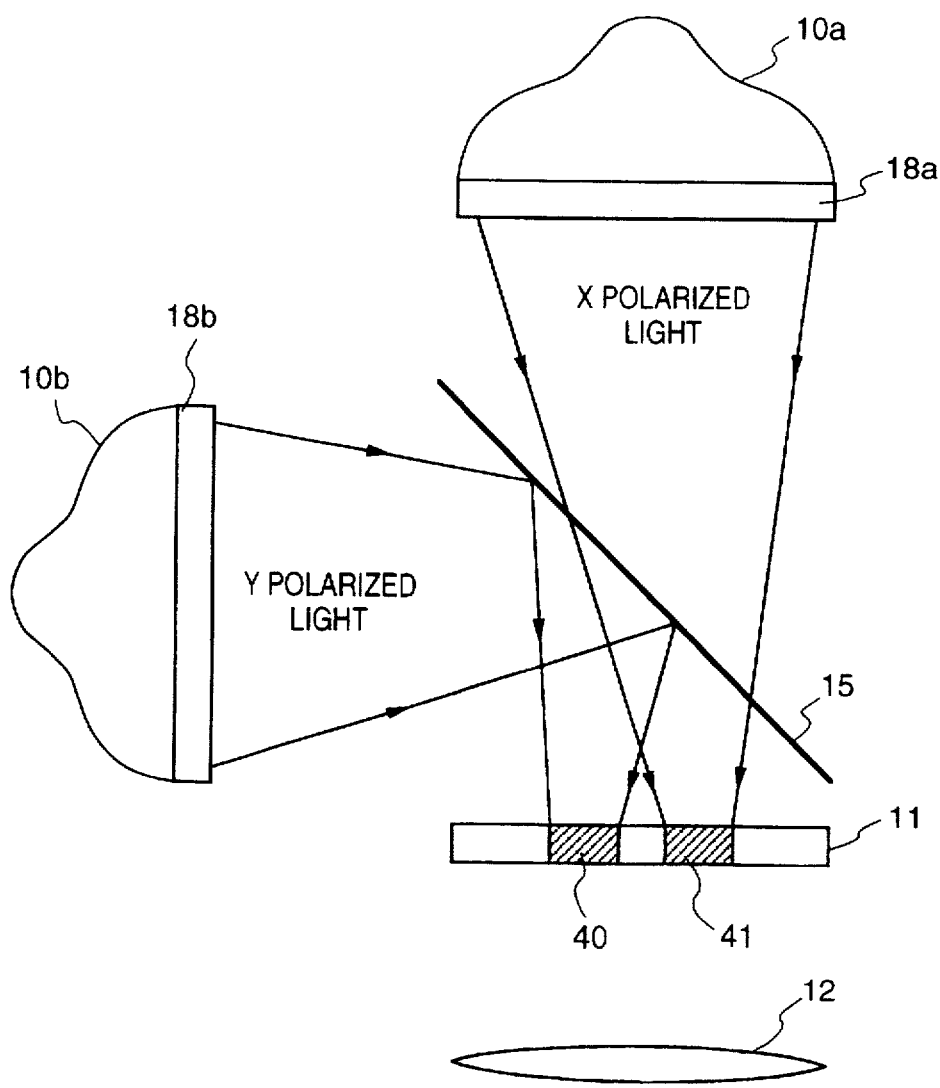
FIG. 13 illustrates an explanatory view for showing that the screen images for the right eye and for the left eye do not reach to the left eye and the right eye, respectively, according to the first embodiment.

FIG. 12 are light paths showing that R screen images from the color CRT 10a reach only the right eye of the viewer 16, and a light path showing that L screen images from the color CRT 10b reach only the left eye of the viewer 16. Further, FIG. 13 illustrates reasons why the R screen images from the color CRT 10a do not reach the left eye of the viewer 16, and why the R screen images from the color CRT 10b do not reach the right eye of the viewer 16. In FIGS. 12 and 13, for a simplicity sake, only one viewer, namely the viewer 16, is shown, thus areas 40 and 41 obtained from the viewer 16 are shown on the liquid crystal display 11.

In FIG. 12, the area 40 (corresponds to the bright area 20a) on the liquid crystal display 11 transmits the X polarized light, since a voltage is applied on the area. On the other hand, the area 41 (corresponds to the dark area 20b) transmits the Y polarized light, since a voltage is not applied on the area. Accordingly, X polarized R screen images from the color CRT 10a are transmitted through the half mirror 15, further transmitted through the area 40 of the liquid crystal display 11. The R screen images which are transmitted through the area 40 are given directivity by passing the Fresnel lens 12 and reach the right eye of the viewer. On the contrary, Y polarized L screen images from the color CRT 10b are reflected by the half mirror 15, further transmitted through the area 41 of the liquid crystal display 11. The L screen images which are transmitted through the area 41 are given directivity by passing the Fresnel lens 12 and reach the left eye of the viewer.

Referring to FIG. 13, in a case where light of the X polarized R screen images from the color CRT 10a comes to the area 41 of the liquid crystal display 11, since the area 41 transmits only Y polarized light, the light of the R images is blocked. Further, in a case where light of the Y polarized L screen image from the color CRT 10b comes to the area 40 of the liquid crystal display 11, since the area 40 transmits only X polarized light, the light of the L images is blocked.

Next, function of the Fresnel lens 12 will be explained with reference to FIG. 7 and others. The Fresnel lens 12 is provided so that the viewers 16 and 17 are able to see the upside-down images of them displayed on the transmission type liquid crystal display 11 as virtual images. By setting the Fresnel lens 12 at a position where the distance between the position and the liquid crystal display 11 is farther than the focal distance of the Fresnel lens 12, the images on the areas 40 and 41 of the liquid crystal display 11 are magnified, where the magnification ratio is limited according to the effective diameter of the Fresnel lens, and the magnified screen images are separately focused at the right eye and the left eye of the viewer 16, respectively. Further, the images in the areas 42 and 43 of the liquid crystal display 11 are also magnified, and separately focused at the right eye and the left eye of the viewer 17, respectively. Therefore, in a case where the areas 40 and 42 transmit light, they function as a selective transmitting light control images for the right eye within the range of the effective diameter of the lens 12, and the viewers 16 and 17 can see the images displayed on the color CRT 10a, provided behind the liquid crystal display 11, through the transmitting light control image on the liquid crystal display 11 as upside-down images.

The upside-down images can be magnified in accordance with an arbitrary magnification ratio which is determined by the distance between the Fresnel lens 12 and the display of the color CRT 10a. Regarding the area 40, the function of the transmitting light control image in the liquid crystal display 11 is effective to the right eye of the viewer 16, whereas, regarding the area 42, effective to the right eye of the viewer 17. As described above, since the areas 41 and 43 are not in the state of transmitting light, the left eyes of the viewers 16 and 17 can not see images displayed on the color CRT 10a.

The viewers see the screen images displayed on the color CRT 10a through the Fresnel lens 12, thus the color CRT 10a has to display the R screen image which is turned upside down, therefore also inverted right-to-left in advance to input to the CRT 10a so that the viewer can see the correct image through the lens. In addition, regarding the L screen images, since they are reflected by the half mirror 15, thus they must be not only turned upside down but also converted into reflected image in advance to input to the CRT 10b. The L screen image is inverted right-left by the mirror 15 and then turned upside down by the lens, thus providing a proper L image to the left eye.

As shown in FIG. 3, the transmitting control figures for the right and left eyes are set to be displayed in the left and right areas of the LCD 11, respectively. This display arrangement can be made without a special inversion of the image data in a right-to-left direction, because the LCD is a transmission type display. More specifically, the control figures on the display 11 have to be inverted upside down only.

In FIGS. 3 and 7, transmitting light control images or transmitting light control figures are displayed upside down only on the liquid crystal display 11. The reason for this will be described referring to FIG. 14.

Figure 14:
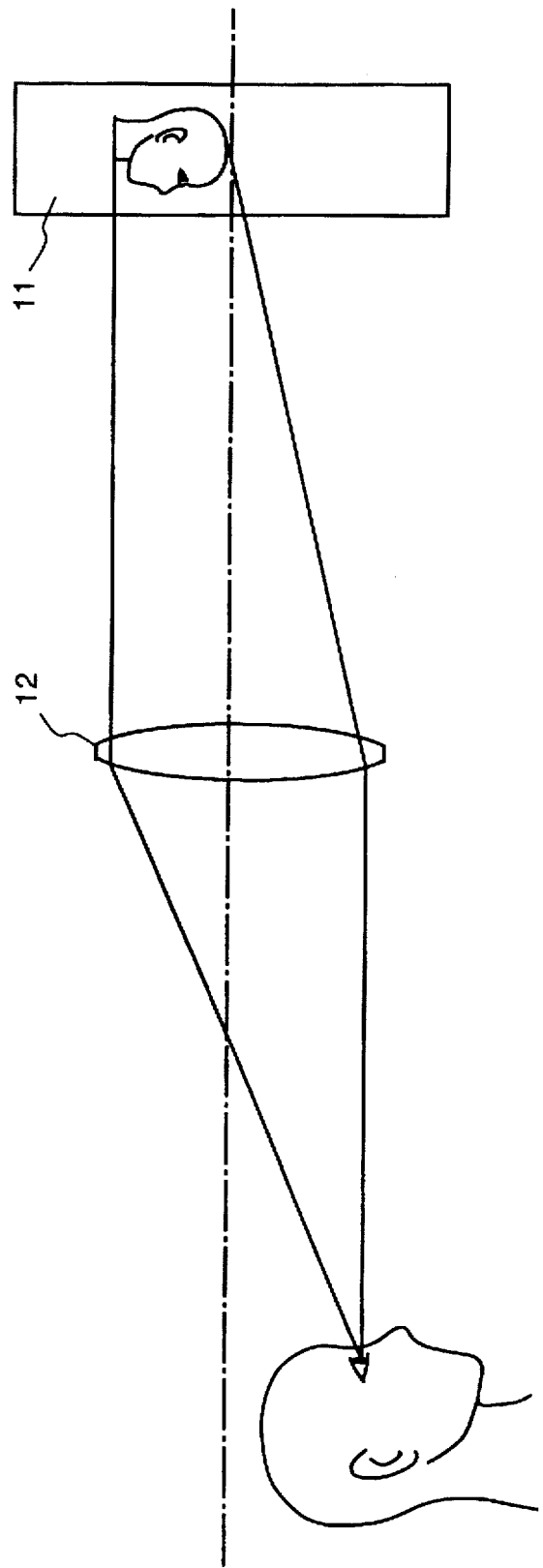
FIG. 14 illustrates a diagram explaining the reason why the transmitting light control image must be inverted upside down.

FIG. 14 explains why the inversion of the images displayed on the liquid crystal display 11 is necessary. If inversion function is not implemented, when the observer sits down, the light transmission image of the observer goes downward, which results in that the image on the liquid crystal display 11 does not function as a transmitting light control figure. In other words, when the observer sits down the light transmission image should be moved upwardly in the liquid crystal display, while when he or she stands up the image should be moved downward. See FIG. 10. The liquid crystal display device 11 achieves the movement of the light transmission image by inverting image data in the vertical direction with respect to the display space of the device 11. The inversion in the vertical direction functions to move an image at a lower (or higher) position to a higher (or lower) position within the display area of the liquid crystal display 11. Inverting image data in the vertical direction may be performed simply by rotating to place the liquid crystal display 11 upside down.

The CRT's and LCD's are an electronic display. They are able to display inverted images the data of which are electronically inverted in longitudinal and right-to-left directions. The inversion can be made just by rotating the display body by 180 degrees.

Another example as to how to achieve displaying arrangement of screen images and control figures according to the first embodiment will be described below.

In FIG. 3, the display 11, 10a, and 10b are indicated with a indicator "Ⓢ". The indicator means a starting point of luster scanning on the displays. For example, the display 10a luster-scans from the lower right position in a right to left direction. The displays 10a, 10b with the indicator attached at the lower right position is turned upside down, namely rotated by 180 degrees. Further, in FIG. 3, arrows mean the direction of inversion. For example, the arrow attached display 11 means that an electronic data inversion is made in the direction indicated by the arrow, namely in a vertical direction.

According to such indications, when data of screen image R are normally inputted to the display 10a, it is displayed on the display 10a with inverted in the vertical and horizontal directions, because the display 10a is turned upside down. The display 10b is also turned upside down. Further, the data of screen image L are inputted to the display 10b with inverted right-to-left. Therefore, the screen image L is seen as inverted only in the vertical direction on the display 10b.

As the indicator is put at the upper left position on the display 11, the display 11 for the control figure is set upright. Therefore, the right portion of the control figure is displayed at a relatively left region on the display 11. The arrow attached to the display 11 means that the data of the control figure are inputted to the display 11 with electronically inverted in the vertical direction. Therefore, the control figure allows to maintain a stereoscopic vision even when the viewer moves in the vertical direction.

According to the operation of the image display apparatus as described above, the R screen images displayed on the color CRT 10a shown in FIG. 3 can be seen by the right eyes of the viewers 16 and 17 through the liquid crystal display 11, whereas the L screen images displayed on the color CRT 10b can be seen by the left eyes through the liquid crystal display 11. Therefore, both the viewers 16 and 17 can see a pair of the R and L screen images simultaneously as to form a stereoscopic image. Further, in a case where the viewers 16 and 17 move, they can see a stereoscopic image as long as the illumination conditions by the LED as shown in FIG. 4 is maintained.

It should be noted that, in the aforesaid embodiment, a color CRT is used as a screen image display device. However, the image display may be substituted by other type displays. It can be a liquid crystal display, for instance, or a flat recording medium or a curved recording medium on which an image is recorded. Further, the minimum required function of the image display device is to display a moving picture as light emitting images, thus the image display device can have a flat or curved device (e.g., a film) where images are recorded and a device to display the images, instead of CRTs. The LED 14 used as an irradiation device can be replaced by a device capable of irradiating infrared, e.g., a halogen lamp attached with a wavelength filter to limit the range of wavelength of light to be emitted. Further, a Fresnel lens is used as an element, however, it can be replaced by a lens as far as having directivity characteristics, e.g., a convex lens or a concave mirror.

Further, in the first embodiment, figures corresponding to the half of the viewer's face displayed on the liquid crystal display 11 and images on the color CRT 10a are described as serving for the right eye, however, the same object is attained by inverting all the conditions for right to for left and all the conditions for left to for right, needless to say.

<Second Embodiment>

Figure 15:
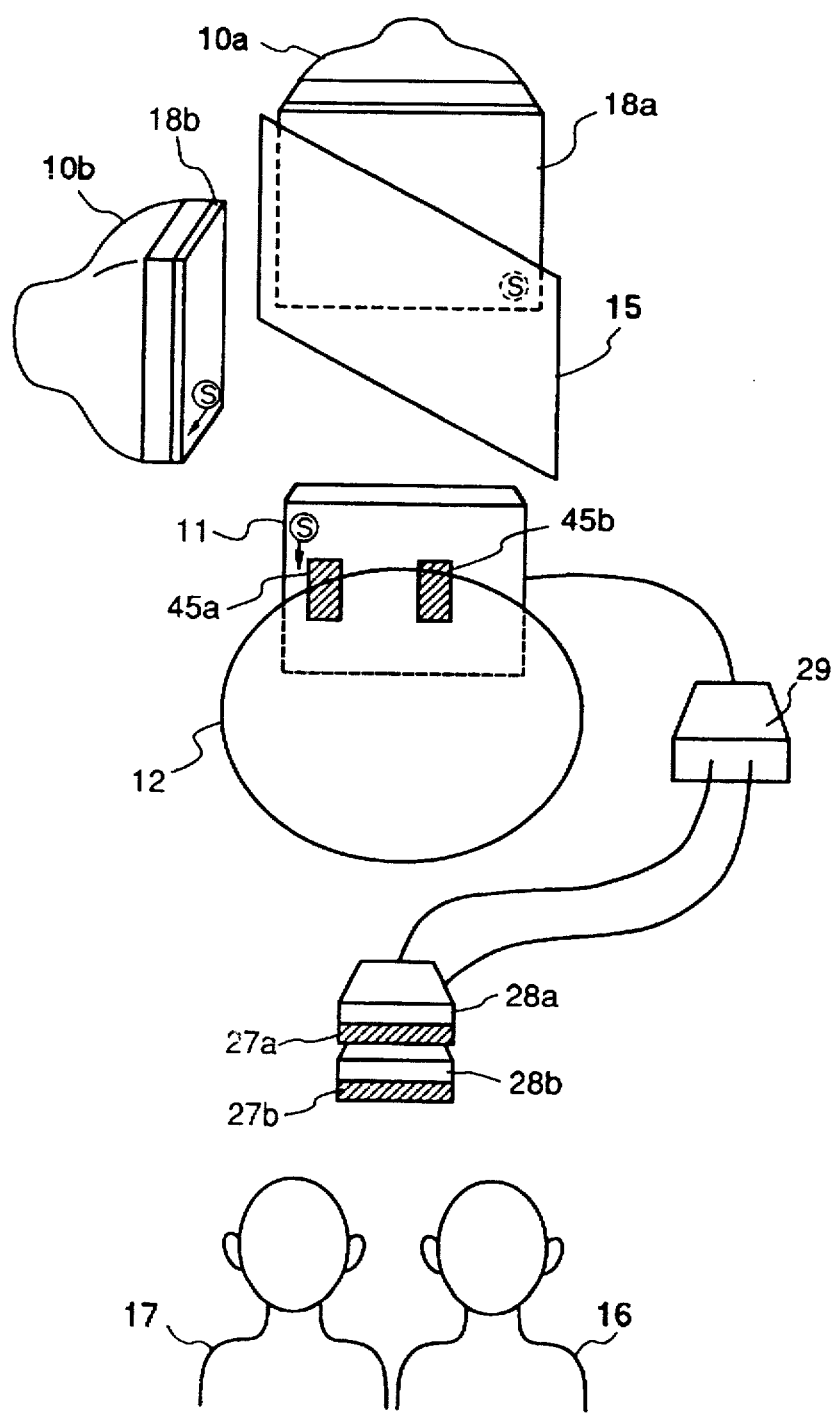
FIG. 15 illustrates a configuration of a stereoscopic image display apparatus according to a second embodiment of the present invention.

FIG. 15 shows a configuration of a stereoscopic image display apparatus according to a second embodiment of the present invention. Similar to the previous embodiments, in the apparatus according to the present embodiment comprises a plurality of displays. The displays are set "normally" unless otherwise specified.

In FIG. 15, reference numerals 10a and 10b denote color CRTs as image display devices; 18a and 18b, polarizing plates attached to displays of the color CRTs 10a and 10b. The polarizing plates 18a and 18b are set so that their polarization directions are perpendicular to each other. Reference numeral 15 denotes a half mirror to combine images displayed on the color CRTs 10a and 10b into a single image; 11, a mono-chromatic transmission type liquid crystal display as liquid crystal display elements; 12, a Fresnel lens having focal distance of 240 nm as a lens. The Fresnel lens is placed at a position beyond the focal distance of the lens 12 from the transmission type liquid crystal display 11, 280 mm, for instance. Reference numerals 16 and 17 denote viewers to see stereoscopic images; and 27a and 27b, ultrasonic emitters which emit ultrasonic having frequencies of 100 kHz and 120 kHz against the viewer 16 and 17, respectively. Further, ultrasonic detectors 28a and 28b selectively detect ultrasonic emitted by the ultrasonic emitters 27a and 27b. Reference numeral 29 denotes an image output device; and 45a and 45b, figures corresponding to right half faces of the viewers 16 and 17 displayed on the transmission type liquid crystal display 11.

The operation of the stereoscopic image display apparatus constructed as above is basically the same as the one described in accordance with the first embodiment of the present invention with reference to FIG. 3, thus the same elements, devices, and the like, in this embodiment as in the first embodiment are referred by the same reference numerals, and the description of them are omitted, and only different elements, devices, and the like, will be explained. The ultrasonic of two different frequencies emitted from the ultrasonic emitters 27a and 27b are reflected by the viewers 16 and 17, and respectively detected by the ultrasonic detectors 28a and 28b. The image output device 29 calculates positions corresponding to the right and left half faces of the viewers which will be displayed on the transmission type liquid crystal display 11 from the detected ultrasonic signals, then a predetermined figures through which R screen image is transmitted for the right eye (referred as "R transmitting light control figures", hereinafter) is outputted and displayed at the calculated positions on the transmission type liquid crystal display 11.

Figure 16:
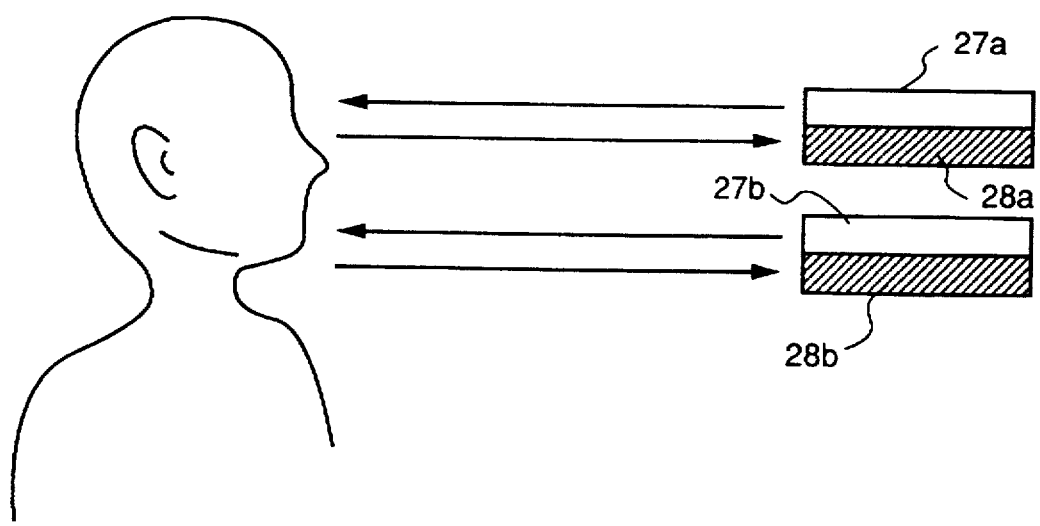
FIG. 16 illustrates an explanatory view of theory of detecting a position of a viewer according to the second embodiment of the present invention.

The operations of the second embodiment will be described in detail with reference to FIG. 16.

The ultrasonic of two different frequencies emitted from the ultrasonic emitters 27a and 27b is reflected by the viewers 16 and 17, and respectively detected by the ultrasonic detectors 28a and 28b. In FIG. 16, the emitter 27a continuously emits ultrasonic in the horizontal direction, and the ultrasonic which is reflected by the viewers' faces is detected by the detector 28a as horizontal cross sectional information. Likewise, the emitter 27b, provided below the emitter 27a, continuously emits ultrasonic in the horizontal direction, and the ultrasonic which is reflected by the viewers' faces is detected by the detector 28b.

The ultrasonic emitters 27a and 27b emit ultrasonic in order to scan in the horizontal direction. Then the ultrasonic of two different frequencies, separated in the vertical direction, emitted by the emitter 27a and 27b are reflected by the observers in the scanning line, and the reflected ultrasonic is respectively detected by the detectors 28a and 28b. Thereby, it is possible to investigate the positions of the viewers' faces by analyzing the echoed signals of ultrasonic.

The output from the detectors 28a and 28b is inputted to the image output device 29 connected to the detectors. The image output device 29 calculates the position of the viewers' faces in accordance with the echoed signals from the detectors 28a and 28b, then outputs and display the predetermined R and L figures on the liquid crystal display 11 in accordance with the calculated position of the faces.

In the second embodiment, the detectors 28a, 28 detect the position of the viewers' face correctly. Therefore, it is easy to process so as not to display portions other than portions corresponding to the viewers' faces, thus crosstalk of left (right) and right (left) images which might be recognized by right (left) and left (right) eyes, respectively, because of small external scattered light, does not occur.

FIG. 15 further illustrates another example how to set the displays 10a, 10b, 11 in order to achieve the inversions of screen images and control figures according to the second embodiment. The setting is similar to the first embodiment.

<Third Embodiment>

Figure 17:
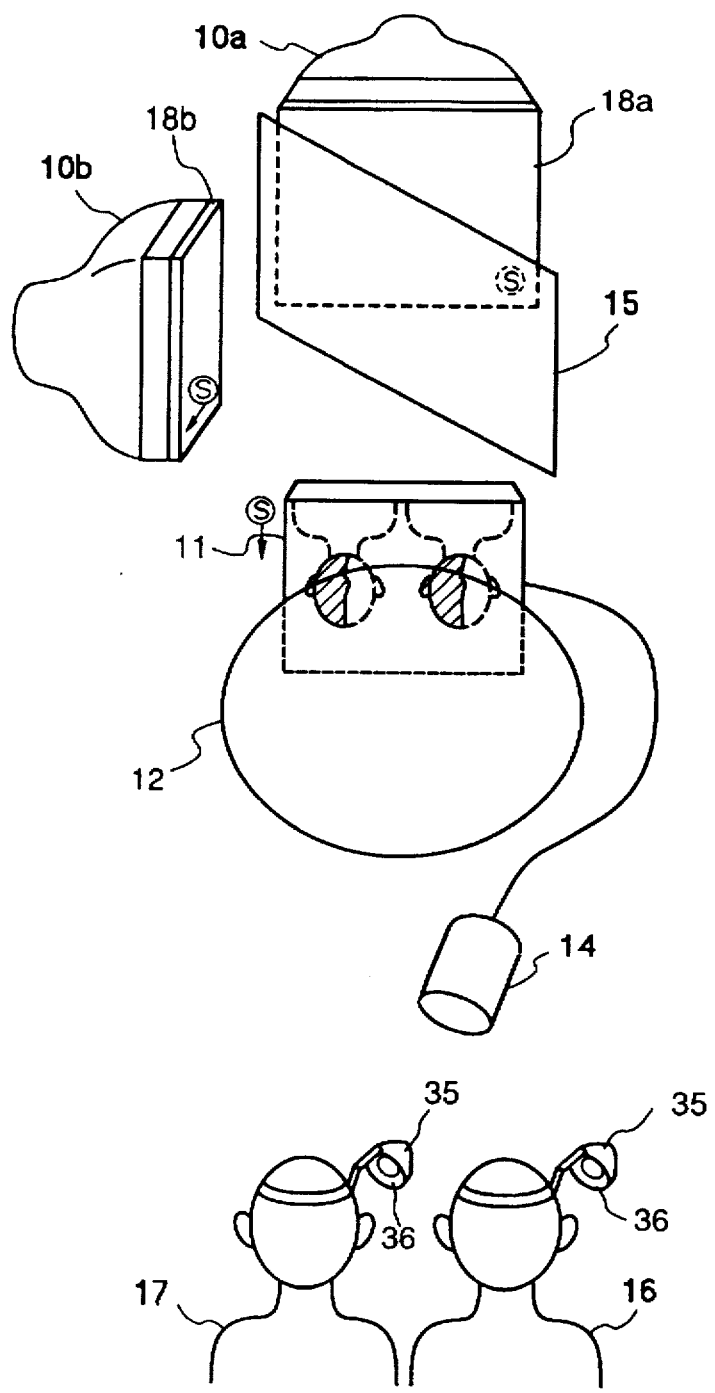
FIG. 17 illustrates a configuration of a stereoscopic image display apparatus according to a third embodiment of the present invention.

FIG. 17 illustrates a configuration of a stereoscopic image display apparatus according to a third embodiment of the present invention. Similar to the previous embodiments, in the apparatus according to the present embodiment comprises a plurality of displays. The displays are set "normally" unless otherwise specified.

The third embodiment has its characteristics at a point where illuminating light source is fixed on the head of a viewer so that the correct position of the viewer's face can be measured.

In FIG. 17, reference numerals 10a and 10b denote color CRTs as image display devices; 18a and 18b, polarizing plates attached to displays of the color CRTs 10a and 10b. The polarizing plates 18a and 18b are set so that their polarization directions are perpendicular to each other. Reference numeral 15 denotes a half mirror to combine images displayed on the color CRTs 10a and 10b into a single image; 11, a mono-chromatic transmission type liquid crystal display as liquid crystal display elements; 12, a Fresnel lens having focal distance of 240 nm as a lens. The Fresnel lens is placed at a position where is farther than the focal distance of the lens 12 from the transmission type liquid crystal display 11, 280 mm, for instance. Irradiation devices 35 are LEDs emitting light of wavelength of 850 nm, and provided on the head of the viewer with head bands. Each of the irradiation device is covered by blocking covers 36. The reference numeral 14 denotes a monochrome CCD camera; and 16 and 17, viewers who see stereoscopic images.

The operation of the stereoscopic image display apparatus constructed as above is basically the same as the one described in accordance with the first embodiment of the present invention with reference to FIG. 3, thus the same elements, devices, and the like, in this embodiment as in the first embodiment are referred by the same reference numerals, and the description of them are omitted, and only different elements, devices, and the like, will be explained. The LEDs 35 are provided on each head of the viewers 16 and 17, thus light emitted from each LED 35 certainly illuminates right sides of viewers. Further, differing from the case described in the first embodiment, the relative positions of the LED and the viewer do not change, thus the viewer can move freely. The blocking cover 36 is to prevent the light of the LED from illuminating another viewer next to the viewer wearing the LED.

FIG. 17 further illustrates another example how to set the displays 10a, 10b, 11 in order to achieve the inversions of screen images and control figures according to the second embodiment. The setting is similar to the first embodiment.

<Fourth Embodiment>

Figure 18:
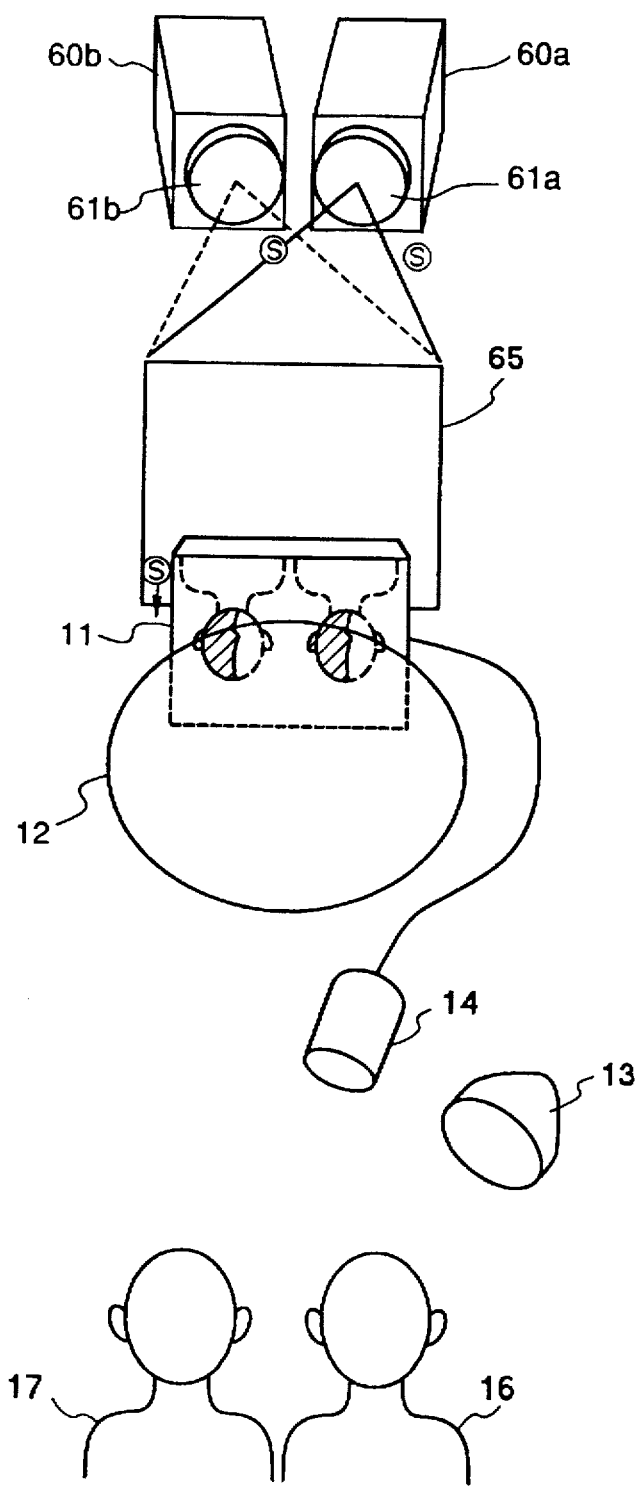
FIG. 18 illustrates a configuration of a stereoscopic image display apparatus according to a fourth embodiment of the present invention.

FIG. 18 illustrates a configuration of a stereoscopic image display apparatus according to a fourth embodiment of the present invention. Similar to the previous embodiments, in the apparatus according to the present embodiment comprises a plurality of displays. The displays are set "normally" unless otherwise specified.

In FIG. 18, reference numerals 60a and 60b denote projection televisions as image display devices; 61a and 61b, polarizing plates attached to image output units of the projection televisions 60a and 60b. The polarizing plates 60a and 60b are set so that their polarization directions are perpendicular to each other. Reference numeral 65 denotes a transmission type screen for projecting images outputted from the projection televisions 60a and 60b; 11, a monochromatic transmission type liquid crystal display as liquid crystal display elements; 12, a Fresnel lens having focal distance of 240 nm as a lens. The Fresnel lens is placed at a position where is farther than the focal distance of the lens 12 from the transmission type liquid crystal display 11, 280 mm, for instance. Further, reference numeral 13 denotes a LED which emits light having wavelength of 850 nm as an irradiation device; 14, a monochrome CCD camera as an image sensing device; 16 and 17 are viewers who see stereoscopic images.

The operation of the stereoscopic image display apparatus constructed as above is basically the same as the one described in accordance with the first embodiment of the present invention with reference to FIG. 3, thus the same elements, devices, and the like, in this embodiment as in the first embodiment are referred by the same reference numerals, and the description of them are omitted, and only different elements, devices, and the like, will be explained.

In the fourth embodiment, output images from the projectors 60a, 60b are projected and combined on the single screen 65, therefore a half mirror becomes unnecessary. In this case, the polarizing plates 61a and 61b are respectively attached to the projectors of the projection televisions 60a and 60b, where the polarizing plates 61a and 61b are set so that their polarization directions are perpendicular to each other. Thereby, the light beams of the projected output screen images have the polarization directions perpendicular to each other.

In the system of FIG. 18, the right and left screen images are input to the projectors 60a, 60b, respectively so that they are turned upside down, therefore also inverted right-to-left. The turned screen images are corrected by the lens 12 to enter the right and left eyes, respectively. On the other hand, the control figures to be displayed on LCD 11 may have to be inverted upside down only, because the transmission type LCD 11 can display the right and left control figures in the left and right areas of the LCD display 11, respectively.

FIG. 18 further illustrates one example as to how to set the displays 60a, 60b, 11 in order to achieve the inversions of screen images and control figures according to the fourth embodiment.

The projectors 60a, 60b are rotated by 180 degrees, thus they display the screen images with inverted in both the vertical and right-to-left directions.

In the fourth embodiment, the projection television is used as the image display device, however, it is not limited to this, and the image display device can be a slide projector, an over-head projector, or the like, as far as the device is able to make projection on the transmission type screen.

Further, in the fourth embodiment, images to be seen by the viewers are projected on the transmission type screen from the back, however, they can be projected from the front, needless to say.

<Fifth Embodiment>

Figure 19:
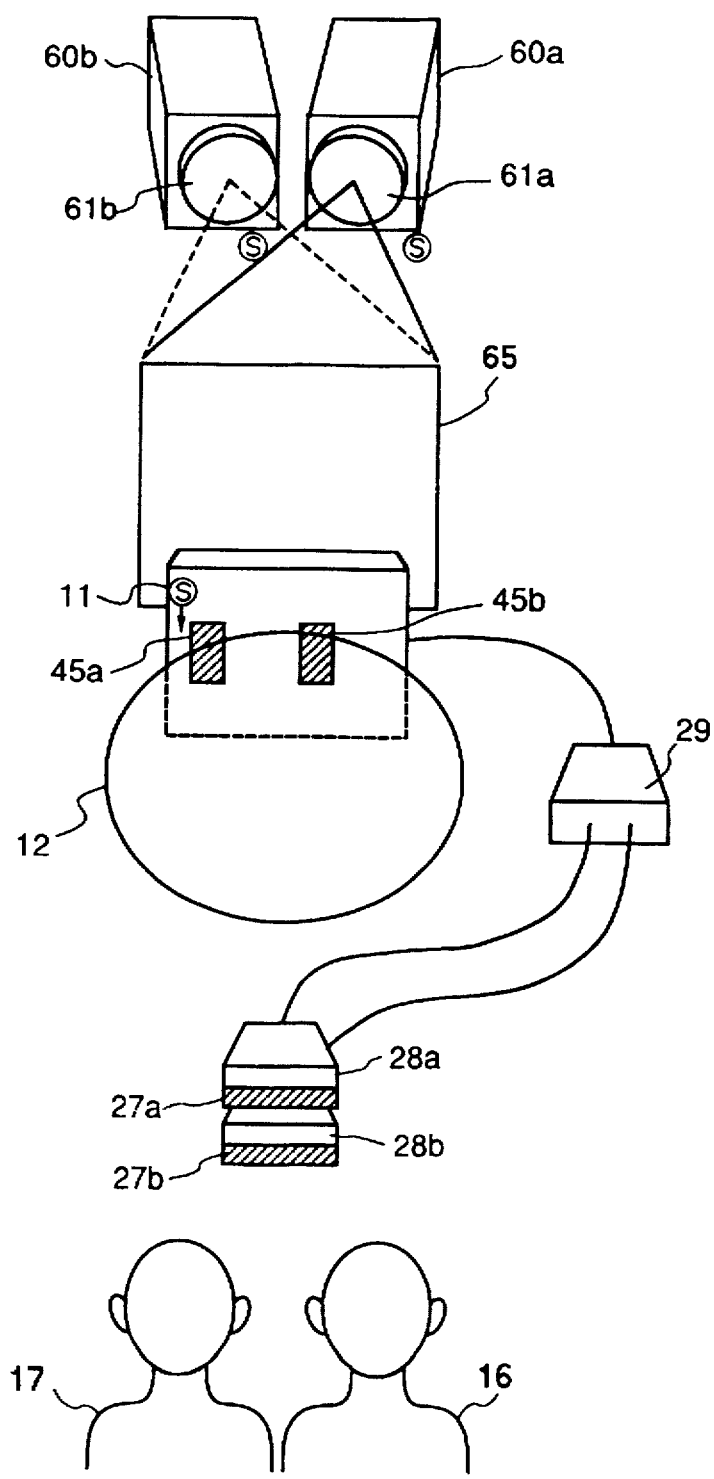
FIG. 19 illustrates a configuration of a stereoscopic image display apparatus according to a fifth embodiment of the present invention.

FIG. 19 illustrates a configuration of a stereoscopic image display apparatus according to a fifth embodiment of the present invention. The fifth embodiment is a combination of the display system according to the fourth embodiment and the function of detecting the positions of viewers by using ultrasonic according to the second embodiment. Similar to the previous embodiments, in the apparatus according to the present embodiment comprises a plurality of displays. The displays are set "normally" unless otherwise specified.

In FIG. 19, reference numerals 60a and 60b denote projection televisions as image display devices; 61a and 61b, polarizing plates attached to image output units of the projection televisions 60a and 60b. The polarizing plates 60a and 60b are set so that their polarization directions are perpendicular to each other. Reference numeral 65 denotes a transmission type screen for projecting images outputted from the projection televisions 60a and 60b; 11. a monochromatic transmission type liquid crystal display as liquid crystal display elements; and 12. a Fresnel lens having focal distance of 240 nm as a lens. The Fresnel lens is placed at a position where is farther than the focal distance of the lens 12 from the transmission type liquid crystal display 11, 280 mm, for instance. Reference numerals 16 and 17 denote viewers to see the stereoscopic images; and 27a and 27b, ultrasonic emitters which emit ultrasonic having frequencies of 100 kHz and 120 kHz against the viewers 16 and 17, respectively. Further, ultrasonic detectors 28a and 28b selectively detect ultrasonic emitted by the ultrasonic emitters 27a and 27b. Reference numeral 29 denotes an image output device; and 45a and 45b, figures corresponding to right half faces of the viewers 16 and 17 displayed on the transmission type liquid crystal display 11.

The operation of the stereoscopic image display apparatus constructed as above is basically the same as the one described in accordance with the fourth embodiment of the present invention with reference to FIG. 18, thus the same elements, devices, and the like, in this embodiment as in the fourth embodiment are referred by the same reference numerals, and the description of them are omitted, and only different elements, devices, and the like, will be explained. The ultrasonic of two different frequencies emitted by the ultrasonic emitters 27a and 27b are reflected by the viewers 16 and 17, and respectively detected by the ultrasonic detectors 28a and 28b. The image output device 29 calculates positions corresponding to the right and left half faces of the viewers on the transmission type liquid crystal display 11 from the detected ultrasonic signals, then a predetermined R transmitting light control figures is outputted and displayed at the calculated positions on the transmission type liquid crystal display 11.

The apparatus according to the fifth embodiment can provide the same advantages as the second embodiment as to preventing a cross-talk.

FIG. 19 further illustrates another example as to how to set the displays 60a, 60b, 11 in order to achieve the inversions of screen images and control figures according to the fifth embodiment.

The setting is similar to the fourth embodiment.

<Sixth Embodiment>

Figure 20:
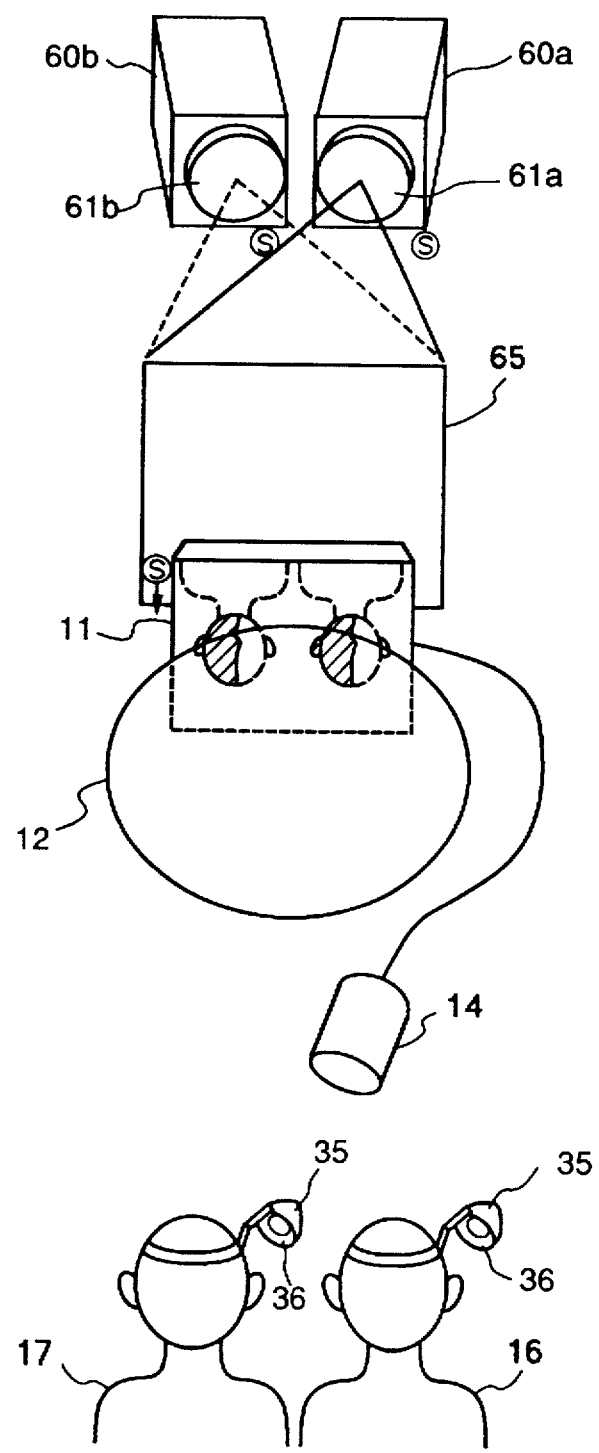
FIG. 20 illustrates a configuration of a stereoscopic image display apparatus according to a sixth embodiment of the present invention.

FIG. 20 illustrates a configuration of a stereoscopic image display apparatus according to a sixth embodiment of the present invention. Similar to the previous embodiments, in the apparatus according to the present embodiment comprises a plurality of displays. The displays are set "normally" unless otherwise specified.

In FIG. 20, reference numerals 60a and 60b denote projection televisions as image display devices; 61a and 61b, polarizing plates attached to image output units of the projection televisions 60a and 60b. The polarizing plates 60a and 60b are set so that their polarization directions are perpendicular to each other. Reference numeral 65 denotes a transmission type screen for projecting images outputted from the projection televisions 60a and 60b; 11, a monochromatic transmission type liquid crystal display as liquid crystal display elements; 12, a Fresnel lens having focal distance of 240 nm as a lens. The Fresnel lens is placed at a position where is farther than the focal distance of the lens 12 from the transmission type liquid crystal display 11, 280 mm, for instance. Irradiation devices 35 are LEDs emitting light of wavelength of 850 nm, and provided on the head of the viewer with head bands. Each of the irradiation device is covered by blocking covers 36. The reference numeral 14 denotes a monochrome CCD camera; 16 and 17, viewers who see stereoscopic images.

The operation of the stereoscopic image display apparatus constructed as above is basically the same as the one described in accordance with the fourth embodiment of the present invention with reference to FIG. 18, thus the same elements, devices, and the like, in this embodiment as in the fourth embodiment are referred by the same reference numerals, and the description of them are omitted, and only different elements, devices, and the like, will be explained.

Differing from the case described in the first embodiment, the relative positions of the LED and the viewer do not change, thus the viewer can move freely. The block cover 36 is to prevent the light of the LED from illuminating another viewer next to the viewer wearing the LED.

FIG. 20 further illustrates another example as to how to set the displays 60a, 60b, 11 in order to achieve the inversions of screen images and control figures according to the sixth embodiment.

The setting is similar to the fifth embodiment.

<Seventh Embodiment>

Figure 21:
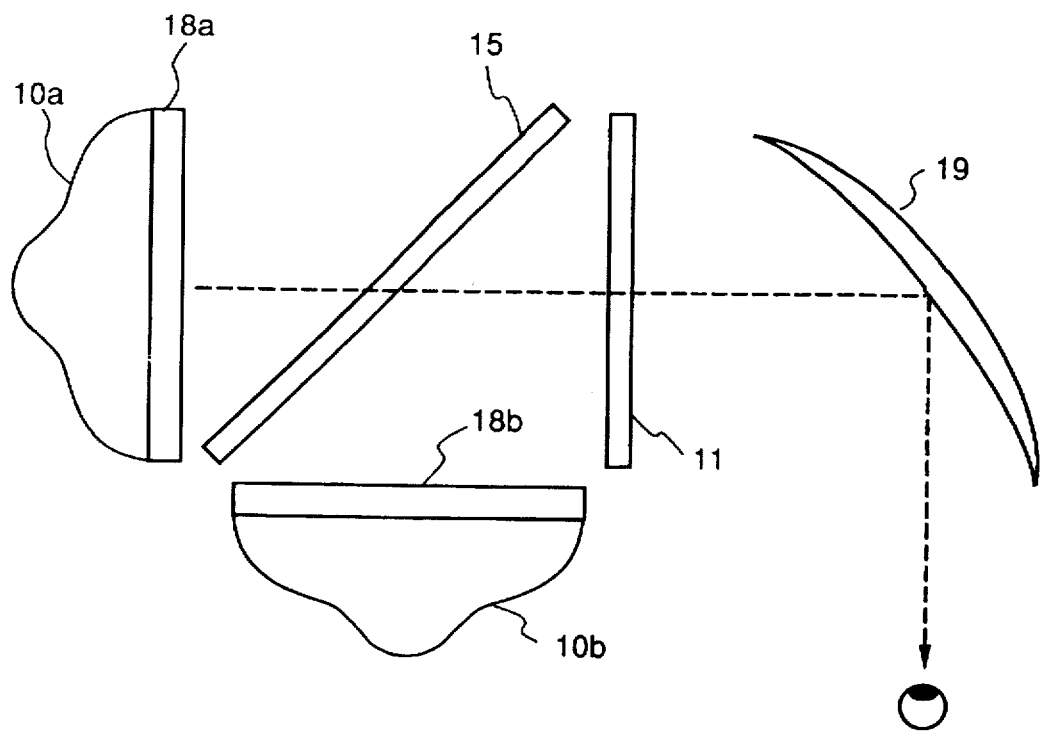
FIG. 21 illustrates a configuration of a stereoscopic image display apparatus according to a seventh embodiment of the present invention.

FIG. 21 illustrates a configuration of a stereoscopic image display apparatus according to a seventh embodiment of the present invention. Similar to the previous embodiments, in the apparatus according to the present embodiment comprises a plurality of displays. The displays are set "normally" unless otherwise specified.

In FIG. 21, reference numerals 10a and 10b denote color CRTs as image display device, and reference numerals 18a and 18b denote polarizing plates attached to image displays of the color CRTs 10a and 10b, respectively. The polarizing plates 18a and 18b are provided so that polarization direction of them are perpendicular to each other. Further, reference numeral 15 denotes a half mirror for combining images displayed on the color CRTs 10a and 10b; 11, a monochromatic transmission type liquid crystal display as a spatial modulation elements; 19, a concave mirror which is placed at a position where is farther than the focal distance of the concave mirror 19 from the transmission type liquid crystal display 11, 280 mm, for instance.

The operation of the stereoscopic image display apparatus constructed as above is basically the same as the one described in accordance with the first to sixth embodiments of the present invention with reference to FIGS. 3 to 20, thus the same elements, devices, and the like, in this embodiment as in the first to sixth embodiments are referred by the same reference numerals, and the description of them are omitted, and only different elements, devices, and the like, will be explained. Further, the devices, such as the image sensing device, the detecting device, and the irradiation device in the first to sixth embodiments are applicable to the seventh embodiment, thus those devices are not shown in FIG. 21.

According to the seventh embodiment, a pair of screen images displayed on the color CRTs 10a and 10b are combined by using the half mirror 15, then the combined image reaches the viewers after reflected by the concave lens 19. The concave mirror 19 also magnifies the images on the transmission type liquid crystal display 11 and also separates R screen images from L screen images, thus a lens is not necessary. The concave mirror is able to produce larger images than the images produced by a lens, therefore, suitable to obtain images for a large display.

17

<Eighth Embodiment>

Figure 22:
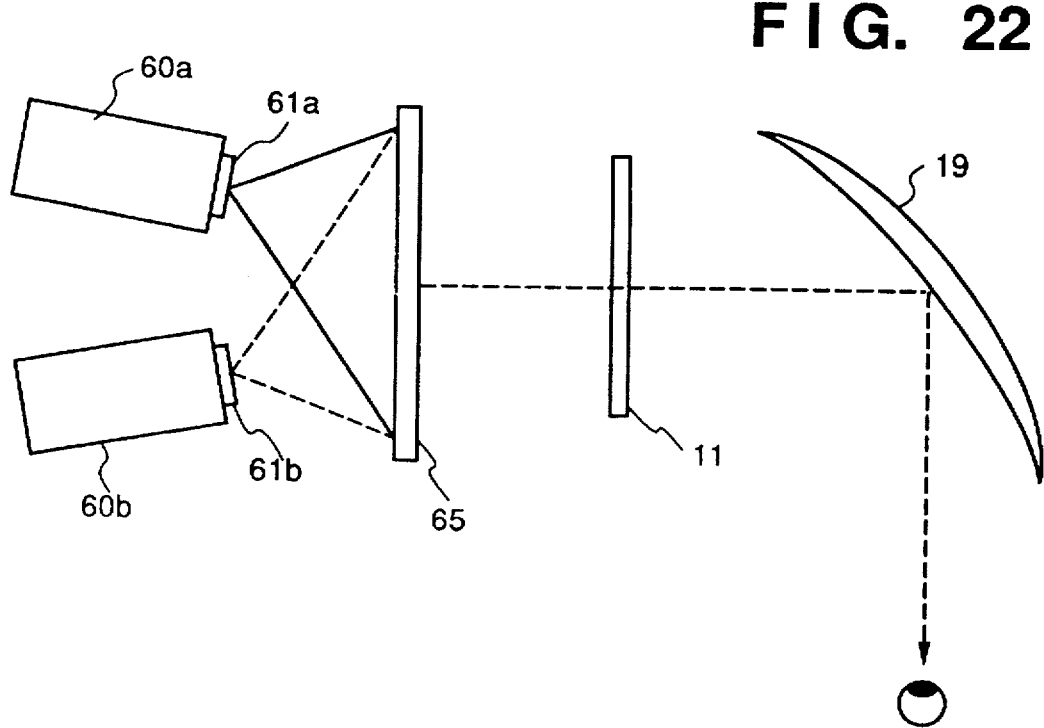
FIG. 22 illustrates a configuration of a stereoscopic image display apparatus according to an eighth embodiment of the present invention.

FIG. 22 illustrates a configuration of a stereoscopic image display apparatus according to an eighth embodiment of the present invention. Similar to the previous embodiments, in the apparatus according to the present embodiment comprises a plurality of displays. The displays are set "normally" unless otherwise specified.

In FIG. 22, reference numerals 60a and 60b denote projection televisions as image display devices; 61a and 61b, polarizing plates attached to image output units of the projection televisions 60a and 60b. The polarizing plates 60a and 60b are set so that their polarization directions are perpendicular to each other. Reference numeral 65 denotes a transmission type screen for projecting the image outputted from the projection televisions 60a and 60b; 11, a mono-chromatic transmission type liquid crystal display as liquid crystal display elements; and 19, a concave mirror which is placed at a position where is farther than the focal distance of the concave mirror 19 from the transmission type liquid crystal display 11.

The operation of the stereoscopic image display apparatus constructed as above is basically the same as the one described in accordance with the first to seventh embodiments of the present invention with reference to FIGS. 3 to 21, thus the same elements, devices, and the like, in this embodiment as in the first to seventh embodiments are referred by the same reference numerals, and the description of them are omitted, and only different elements, devices, and the like, will be explained. Further, the devices, such as the image sensing device, the detecting device, the irradiation device in the first to sixth embodiments are applicable to the seventh embodiment, thus those devices are not shown in FIG. 22.

According to the eighth embodiment, a pair of screen images displayed on the projection televisions 60a and 60b are combined on the transmission type screen 65, then the combined images reach the viewers after reflected by the concave lens 19. The concave mirror 19 also magnifies the images on the transmission type liquid crystal display 11 and separates R screen images from L screen images, thus a lens is not necessary. The concave mirror is feasible to be manufactured than a lens, therefore, suitable to obtain images for a large display.

<Ninth Embodiment>

Figure 23:
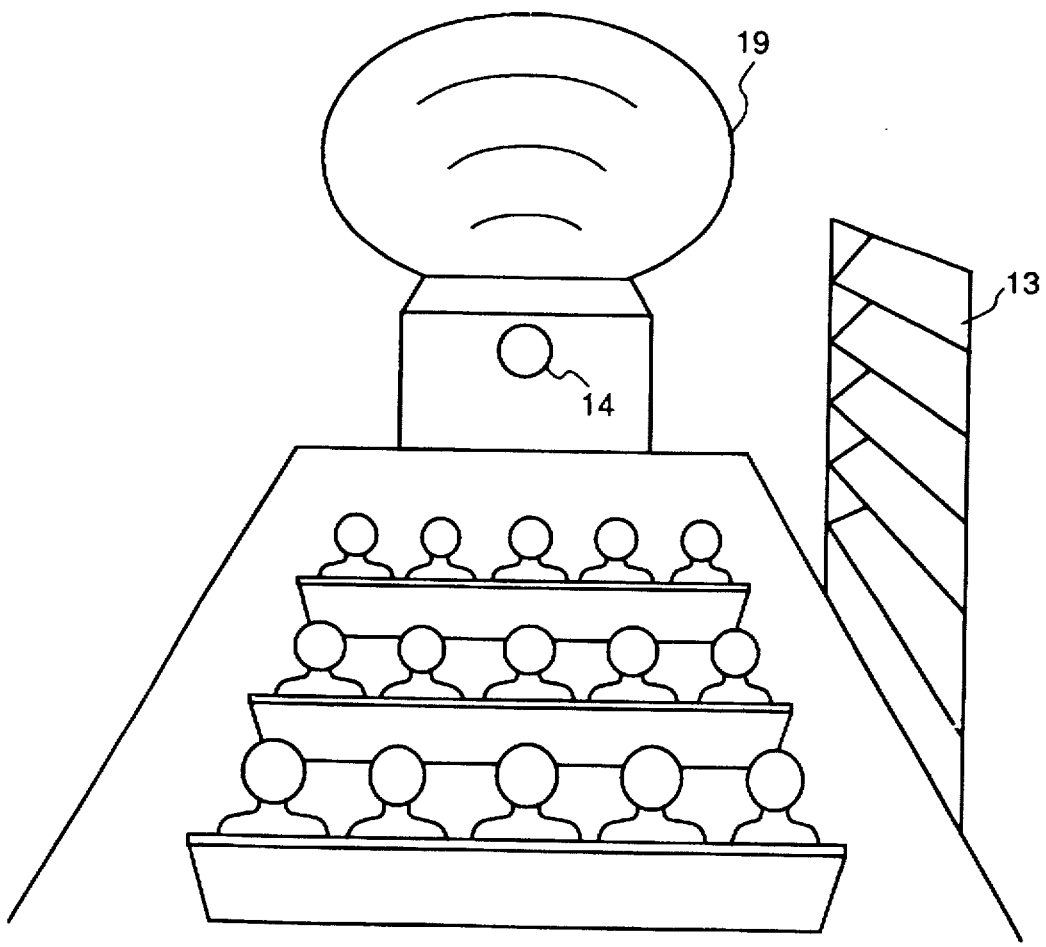
FIG. 23 illustrates a configuration of a stereoscopic image display apparatus according to a ninth embodiment of the present invention.
Figure 24:
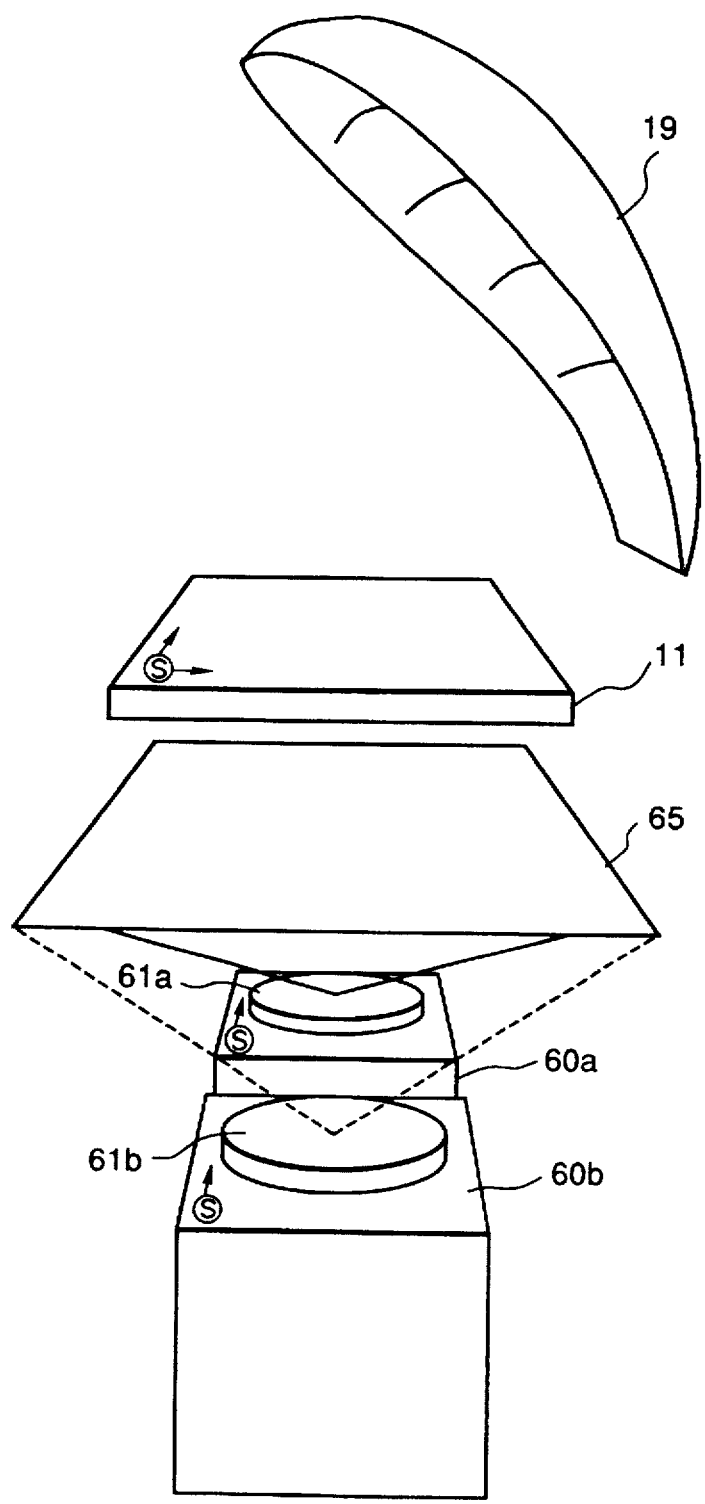
FIG. 24. illustrates a configuration of the stereoscopic image display apparatus according to the ninth embodiment of the present invention.

FIGS. 23 and 24 illustrate configurations of a stereoscopic image display apparatus of the present invention in a case where a large number of viewers see an identical stereoscopic image simultaneously, e.g., used in a theater. The basic configuration is the same as the one described in the eighth embodiment with reference to FIG. 22. Similar to the previous embodiments, in the apparatus according to the present embodiment comprises a plurality of displays. The displays are set "normally" unless otherwise specified.

In FIG. 23, reference numeral 13 denotes a irradiation device for illuminating half faces of viewers; 14, a camera to pick up images of half faces of viewers illuminated by the irradiation device 13; and 19, a large concave mirror for displaying stereoscopic images.

FIG. 24 is an internal view for explaining a configuration of the system shown in FIG. 23, and in FIG. 24, reference numerals 60a and 60b denote projection televisions as image display devices; 61a and 61b, polarizing plates attached to image output units of the projection televisions 60a and 60b. The polarizing plates 60a and 60b are set so that their polarization directions are perpendicular to each other. Reference numeral 65 denotes a transmission type screen for projecting the image outputted from the projection televisions 60a and 60b; 11, a mono-chromatic transmission type liquid crystal display as liquid crystal display elements; 19, a concave mirror having a focal distance of 1200 mm which is placed at a position where is farther than the focal distance of the concave mirror 19 from the transmission type liquid crystal display 11, 1400 mm, for instance.

The operation of the stereoscopic image display apparatus constructed as above is basically the same as the one described in accordance with the eighth embodiment of the present invention with reference to FIG. 22, thus the same elements, devices, and the like, in this embodiment as in the eighth embodiments are referred by the same reference numerals, and the description of them are omitted, and only different elements, devices, and the like, will be explained.

In the ninth embodiment, the large light 13 is provided on a wall in order to illuminate a large number of viewers, and the camera provided below the concave mirror which the viewers actually watch picks up images of right half of viewers' faces, then the picked up images are displayed on the liquid crystal elements 11 and the displayed images serve as transmitting light control figures A pair of screen images displayed on the projection televisions 60a and 60b are combined on the transmission type screen 65, then the combined images reach the viewers after reflected by the large concave lens 19. The concave mirror 19 also magnifies the images on the transmission type liquid crystal display 11 and separates R screen images from L screen images, thus a lens is not necessary. The concave mirror is feasible to be manufactured than a lens, therefore, suitable to obtain images for a large display.

FIG. 24 further illustrates one example as to how to set the displays 60a, 60b, 11 in order to achieve the inversions of screen images and control figures according to the ninth embodiment.

<Tenth Embodiment>

Figure 25:
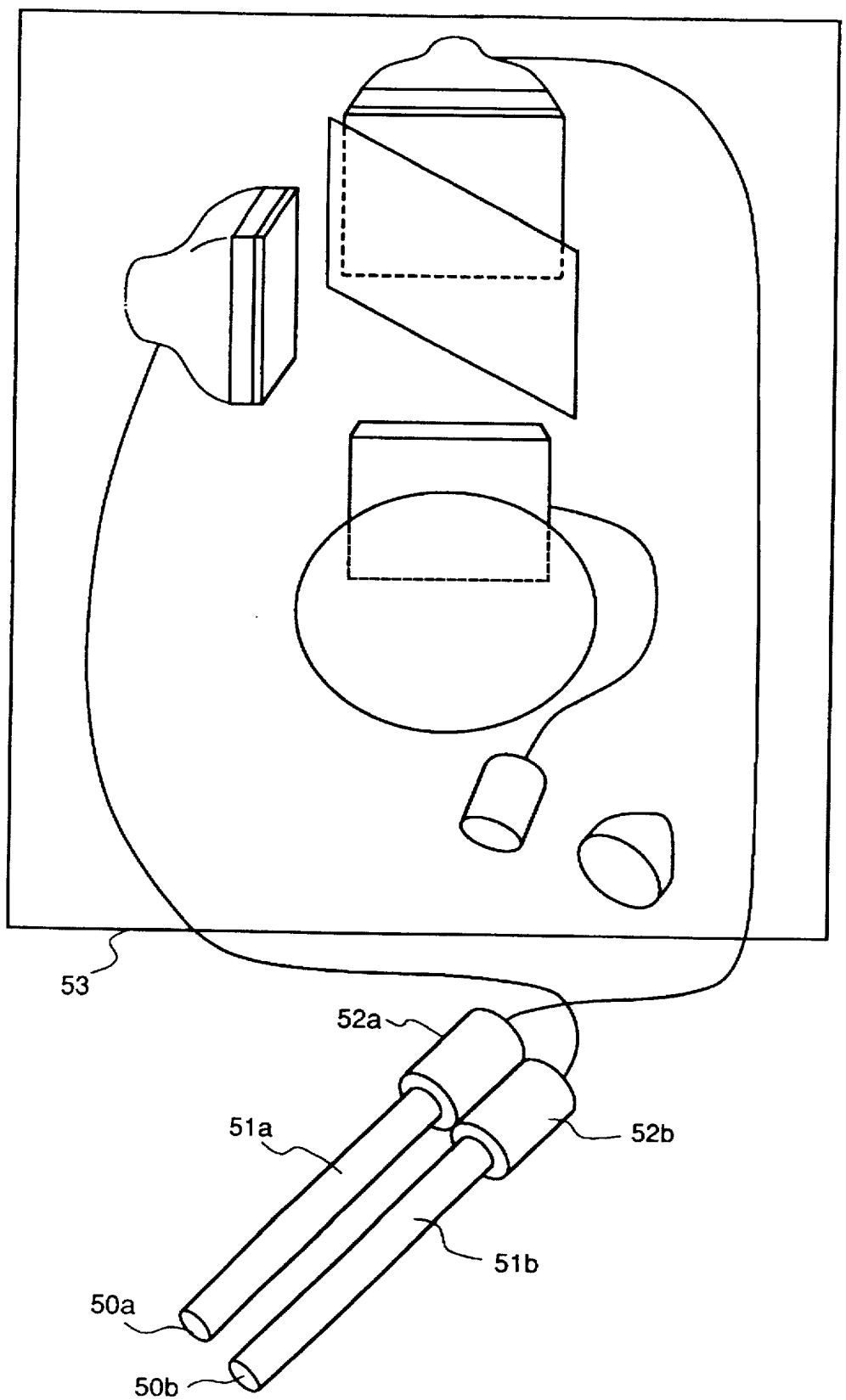
FIG. 25 illustrates a configuration of a stereoscopic image display apparatus according to a tenth embodiment of the present invention.
Figure 26:
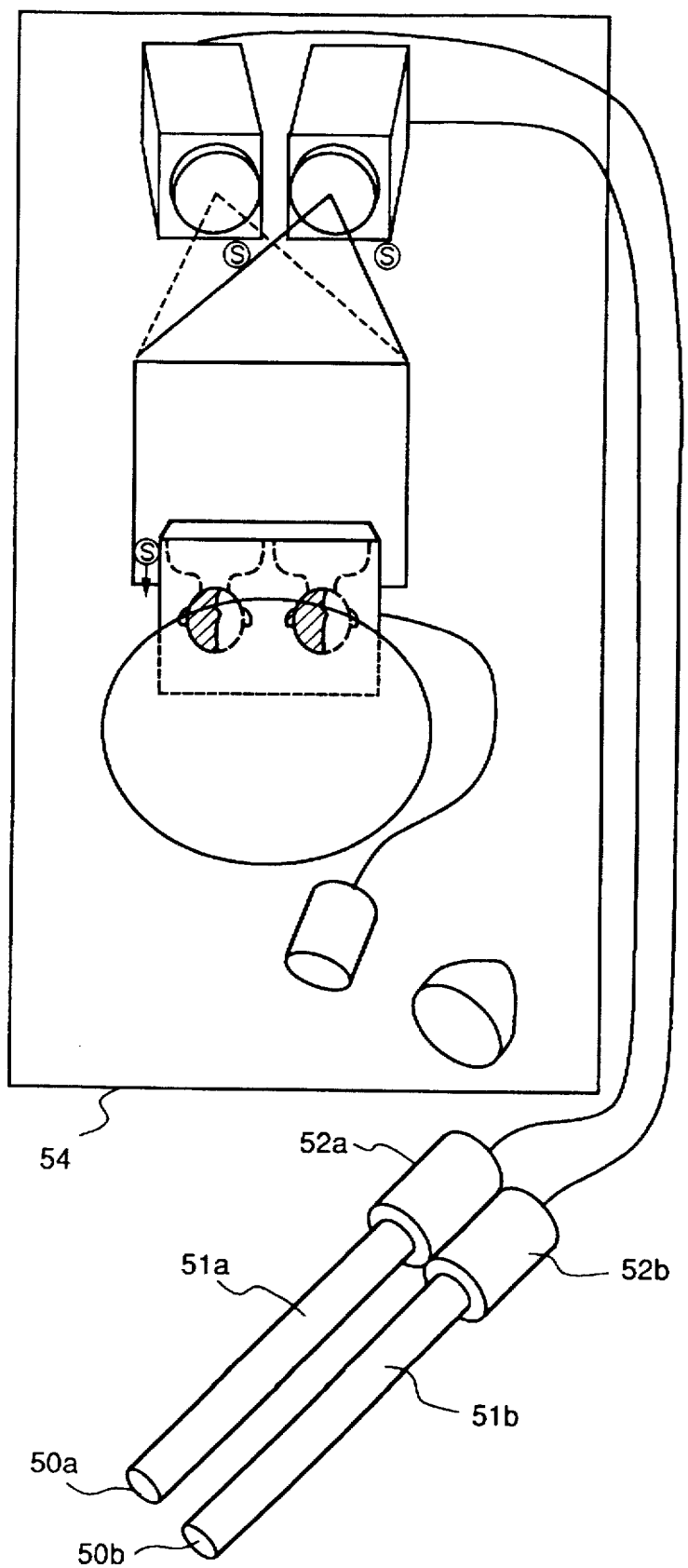
FIG. 26 illustrates a configuration of the stereoscopic image display apparatus according to the tenth embodiment of the present invention.

FIGS. 25 and 26 show configurations of a stereoscopic image display apparatus according to the ninth embodiment applied to an endoscope. Similar to the previous embodiments, in the apparatus according to the present embodiment comprises a plurality of displays. The displays are set "normally" unless otherwise specified.

In FIGS. 25 and 26, reference numerals 50a and 50b denotes objective lenses; 51a and 51b, lens mirrors containing optical elements for guiding the picked-up images, and provided with an angle corresponding to an observer's convergence angle; 52a and 52b, CCD cameras; and 53 and 54, the stereoscopic image display apparatus described in the first and fourth embodiments with reference to FIGS. 3 and 18.

The operation of the endoscopic apparatus constructed as described above will be described.

Two object images picked up by the objective lenses 50a and 50b are respectively focused on the CCD cameras 52a and 52b as R screen images and L screen images by using the lens mirrors 51a and 51b, provided so as to have an angle corresponding to the convergence angle of the observers' eyes for stereoscopic observation, thus functioning as a stereoscopic endoscope. The focused two images are separately inputted into the color CRTs 10a and 10b of the stereoscopic image display apparatus 53 and displayed as a pair of R and L screen images. With the functions of the stereoscopic image display apparatus 53 as described in the first embodiment of the present invention, a plurality of observers are able to observe the identical images taken by the stereoscopic endoscope as stereoscopic images.

It should be noted that the image sensing elements 52a and 52b in the present invention are provided so as to touch the objective lenses 50a and 50b, and the shape of the lens mirrors can be selected arbitrarily by converting the images picked up by the image sensing elements into electrical signals and guiding the signals in the lens mirrors 51a and 51b. Accordingly, a configuration which is more effective to the object of the present invention can be obtained.

Further, the stereoscopic image display apparatus 53 and 54 according to the tenth embodiment are applicable to other embodiments.

<Eleventh Embodiment>

Figure 27:
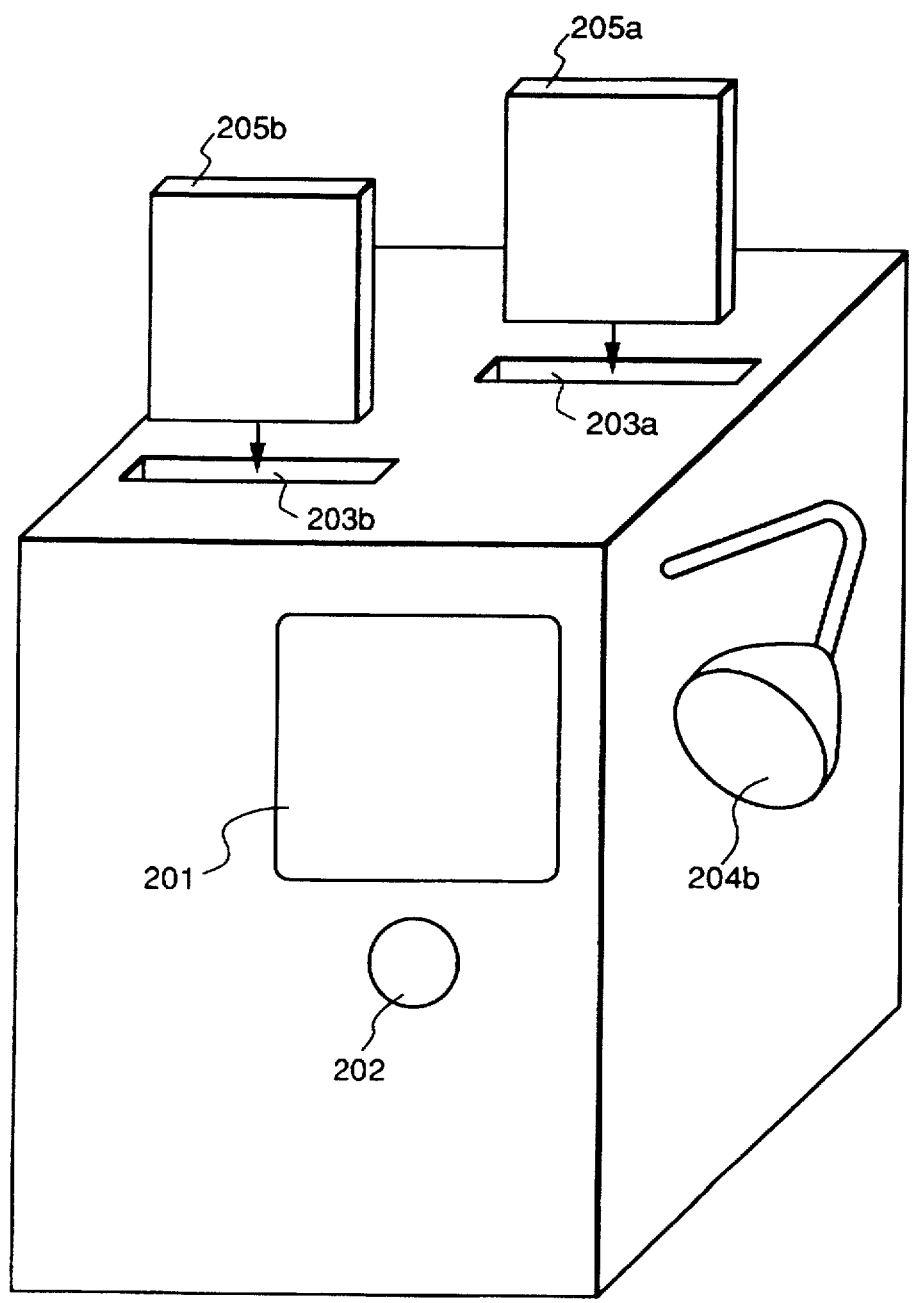
FIG. 27 illustrates a configuration of a stereoscopic image display apparatus according to an eleventh embodiment of the present invention.

FIG. 27 illustrates an external view of a stereoscopic image display apparatus according to an eleventh embodiment of the present invention. The eleventh embodiment apparatus is directed to seeing still images recorded on such films. Similar to the previous embodiments, in the apparatus according to the present embodiment comprises a plurality of displays. The displays are set "normally" unless otherwise specified.

In FIG. 27, reference numeral 201 denotes display field on which images are displayed, 202, CCD camera as image sensing devices; 203a and 203b, connection slits for connecting to recording carriers 205a and 205b of the screen images; and 204, LED light as irradiation devices.

Figure 28:
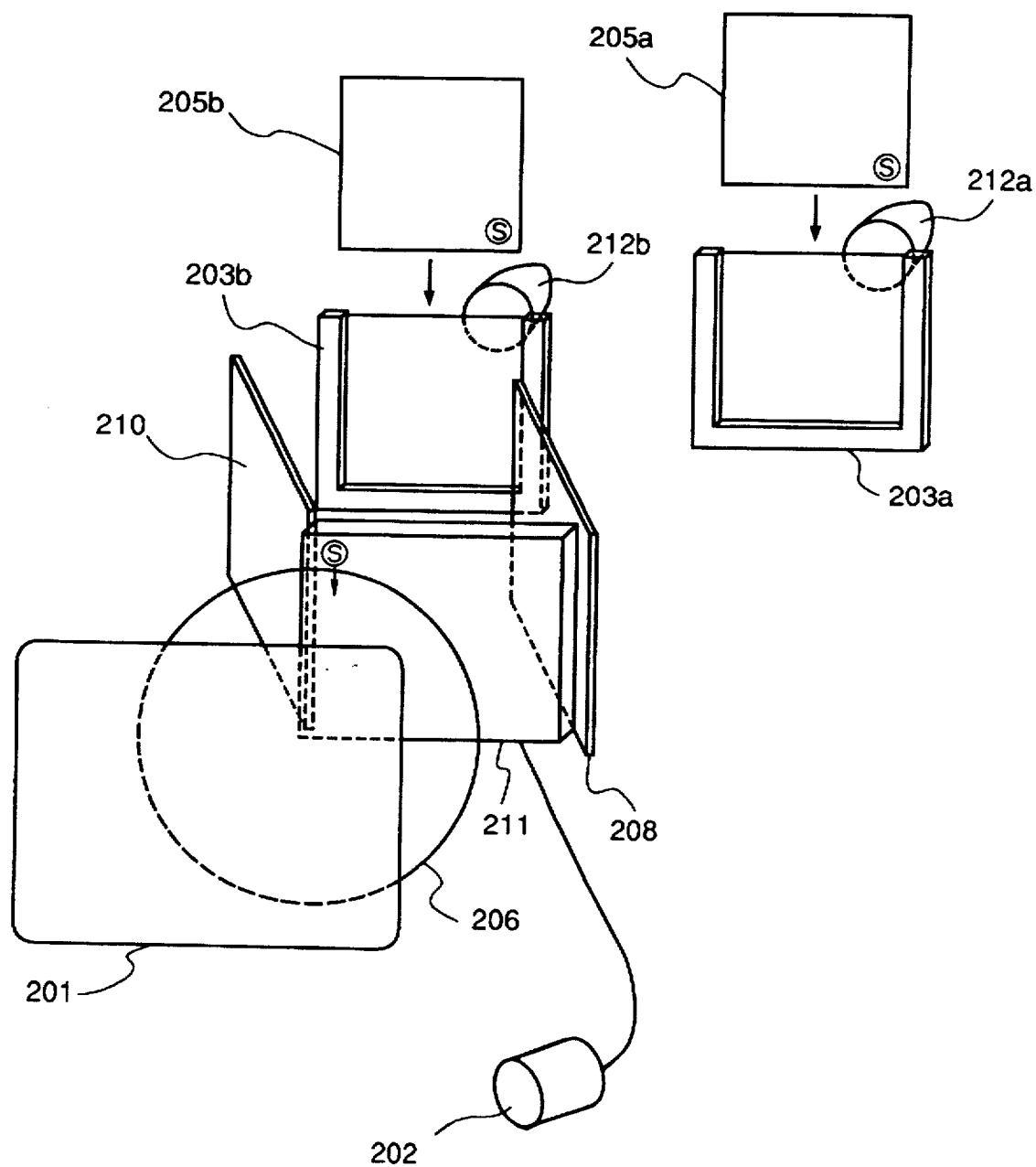
FIG. 28 illustrates an internal configuration of the stereoscopic image display apparatus according to the eleventh embodiment of the present invention.

FIG. 28 is a perspective view illustrating an internal configuration of the stereoscopic display apparatus shown in FIG. 27 according to the eleventh embodiment. In FIG. 28, reference numeral 208 denotes a half mirror for combining R and L screen images; 206, a Fresnel lens having a focal length of 150 mm; 210, a mirror for deflecting light paths of images recorded on the recording carrier 205b, 211, a transmission-type liquid crystal display which is provided with a polarizing plate on a surface thereof, 212a and 212b, back lighting devices provided with polarizing filters which generate lights into the LCD display 211. The polarizing filters have a polarizing characteristic orthogonal to each other. More specifically, the light 212a generates X polarized light and the light 212b generates Y polarized light, where X direction is perpendicular to Y direction.

Figure 29:
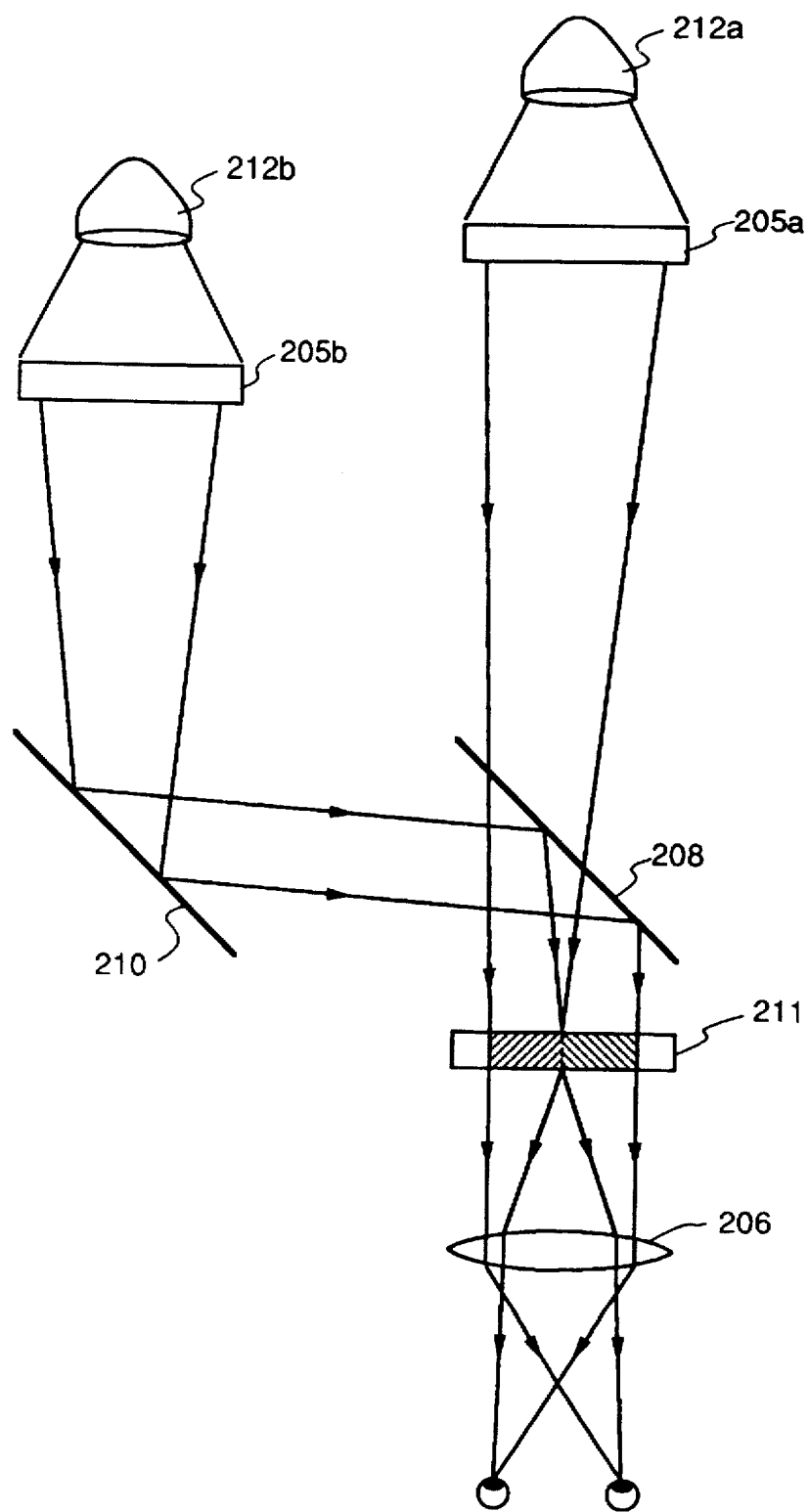
FIG. 29 illustrates a diagram illustrating light paths of the stereoscopic image display apparatus according to the eleventh embodiment.
Figure 31:
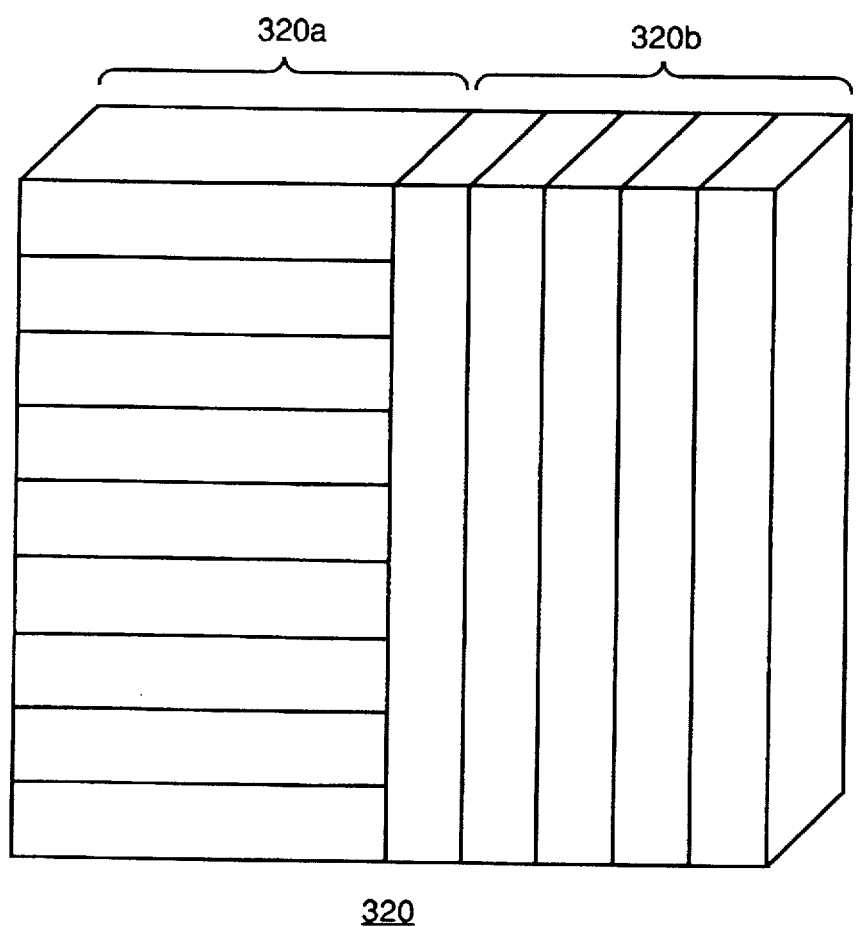
FIG. 31 illustrates a structure of mask plate used in the twelfth embodiment.

FIG. 29 illustrates light paths inside of the screen image display apparatus according to the eleventh embodiment. When an image is irradiated on carrier 205a by X polarized light from the light 212a, the light of the image on carrier 205a passes through the mirror 208 and reaches the LCD display 211. When an image is irradiated on carrier 205b by Y polarized light from the light 212b, the light of the image on carrier 205b passes through the mirrors 210, 208 and reaches the LCD display 211.

The LCD display has the same characteristic as of the first embodiment, namely shown in FIG. 8. An image of right half face of the viewer is displayed on the LCD 211 where a voltage is applied to liquid crystal molecules of the display. 211 which corresponds to the right half face of the viewer. Molecules of display 211 other than that area are applied with voltage. Accordingly, the area of the LCD 211 on which the right half face is displayed allows X polarized light to pass, and areas of the LCD other than the area allow Y polarized light to pass.

As described above, the back lighting devices 212a and 212b irradiate X polarized light and Y polarized light, respectively. Therefore, as shown in FIG. 29, X polarized light representing the recorded image on the carrier 205a passes thorough the mirror 208 and enters only the right eye of the viewer, because the display 211 only allows to pass X polarized light where a voltage is applied. Y polarized light representing the recorded image on the carrier 205b passes thorough the mirrors 210, 208, and enters only the left eye of the viewer, because the display 211 only allows to pass Y polarized light where no voltage is applied.

The carriers 205a and 205b should be inserted into the slits 203a and 203b inverted in longitudinal (upside down) and transverse (right-to left) directions. More specifically, the R screen image on the carrier 205a which are turned in the both directions are corrected by the lens 206 to enter the right eye of the viewer. The L screen image on the carrier 205b which are turned in the both directions are inverted by the mirrors 210, 208 two times, and then corrected by the lens 206 to enter the left eye of the viewer.

As described above, the R and L control figures are displayed in a relatively left and right regions of the LCD 211, respectively. See FIG. 29. Further, the control figures are inverted upside down so that a stereoscopic vision is kept in accordance with the up and down movements of the viewer.

The slits 203a and 203b should be positioned so that they are equally remote from the lens 206. If a difference arises in the distances, the stereo images of the carriers 205a and 205b are unequally magnified by the lens 206, thus providing an inaccurate stereoscopic vision.

<Twelfth Embodiment>

The characteristics of the first to eleventh embodiments are that, when a viewer moves to an arbitrary position, the light transmission image (light transmission figure) and the light blocking image (light blocking figure) are moved in accordance with the viewer's movement. Therefore, in the first to eleventh embodiments, means for detecting a position of the viewer is necessary. In the twelfth embodiment, although the positions to which the viewer can move are limited, but the display apparatus is simplified by using a light control plate. Similar to the previous embodiments, in the apparatus according to the present embodiment comprises a plurality of displays. The displays are set "normally" unless otherwise specified.

FIG. 30 illustrates a screen image display system according to the twelfth embodiment.

In FIG. 30, reference numeral 10a and 10b denote CRT devices for displaying R screen images and L screen images, respectively. In front of each CRT device 10a and 10b, a light blocking plate for the right eye (referred as "R light blocking plate", hereinafter) 317a which polarizes passing light into X direction and a light blocking plate for the left eye (referred as "L light blocking plate", hereinafter) 317b which polarizes passing light into Y direction are provided. The mask plate may utilize a similar structure to the polarizing plate (see FIG. 8) of the first embodiment. More specifically, a voltage is not applied to the section 320a while no voltage is applied to the section 320b.

The light beams representing the images displayed on the CRT's 10a and 10b are combined by the half mirror 15 and enter the mask plate 320. The mask plate 320 is divided into two sections 320a and 320b which positioned in the left and right halves of the plate 320, respectively. The section 320a has a characteristic that it only passes X polarized light, while the section 320b only passes Y polarized light. Therefore, section 320b (located in the right area) functions as a mask for blocking the R screen image, while section 320a (located in the left area) functions as a mask for blocking the L screen image.

Figure 32:
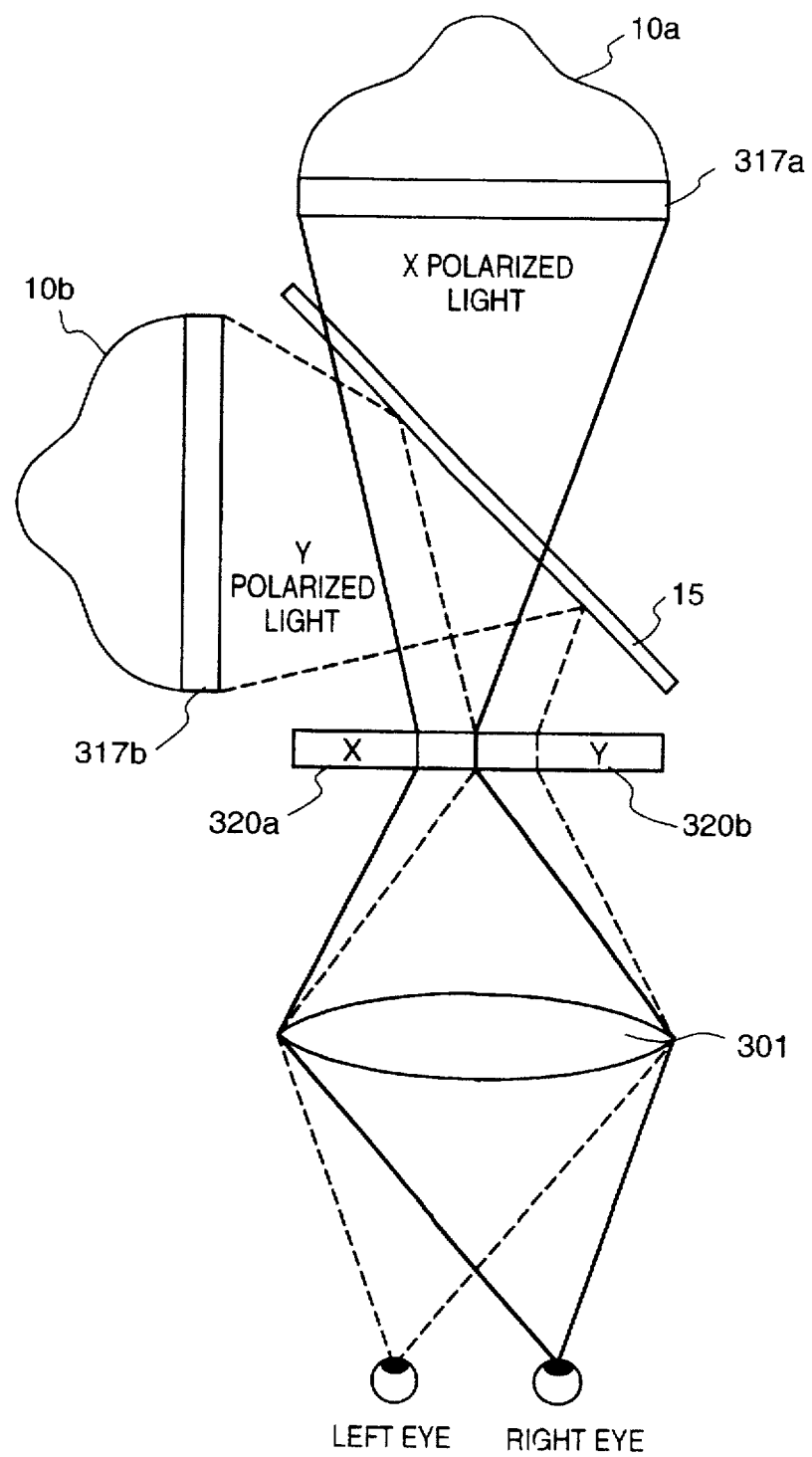
FIG. 32 illustrates an explanatory view of principle according to the twelfth embodiment.

FIG. 32 illustrates the principle of the twelfth embodiment. In the figure, the light of the R screen image from the CRT 10a is polarized into the X direction by the polarizing plate 317a. The X polarized light passes the section 320a which has the characteristic that only passes X polarized light, and enters the right eye of the viewer as inverted image. In this regard, the left eye of the viewer sees the section 320b of the mask plate 320 due to the directivity of the lens 301. However, the section 320b that only passes Y polarized light blocks the X polarized light from the CRT 10a, therefore, the left eye of the viewer cannot see the R screen image displayed on the CRT 10a.

Similarly, the light of the L screen image from the CRT 10b is polarized into the Y direction by the polarizing plate 317b. The Y polarized light passes the section 320b which has the characteristic that only passes Y polarized light, and enters the left eye of the viewer as inverted image. The right eye of the viewer sees the section 320a due to the directivity of the lens 301. However, the section 320a that only passes X polarized light blocks the Y polarized light from the CRT 10b, therefore, the right eye of the viewer cannot see the R screen image displayed on the CRT 10a.

In the system of FIG. 30, the right screen image is input to the CRT 10a so that it is turned upside down, therefore inverted right-to-left. The turned R screen image is corrected by the lens 15 to enter the right eye. On the other hand, the L screen image is input to the CRT 10b with turned upside down and converted into reflected image. The turned L screen image is then turned reflected by the mirror 15, and then corrected by the lens 301 to enter the left eye by turning the image upside down.

Thus, the twelfth embodiment can provide a stereoscopic vision.

<Further Modification>

According to the aforesaid embodiment, an infrared irradiation device is used, however, instead of using it, by putting a material or a hat, processed so as to emit fluorescent light, on the viewer and illuminating with a light source which makes the material or the hat emits fluorescent light, the area corresponds to either right or left half of the viewers emits light.

Further, as the detecting device, it can be the one using ultrasonic or a device detecting electrical waves or magnetic waves, where the electrical wave or magnetic wave is emitted from a transmitter provided on the heads of the viewers.

In order to invert images in the various embodiments described above, the various methods are adopted, for example, turning display body by 180 degrees and/or manipulating the image data. The inversion of images may be realized by other methods. For example, in a transmission type LCD, a right-to-left inversion of image is realized by turning the display by 180 degrees around a vertical axis. A longitudinal inversion of image is realized by turning it 180 degrees around a horizontal axis. In CRT displays, rotating yoke coils therein realizes an inversion of image in a vertical or horizontal direction. Further, changing start point of luster scan in CRT displays will cause an inversion of image in right-to-left direction.

Furthermore, the mirrors may be substituted by any type of beam splitter.

INDUSTRIAL APPLICABILITY

A stereoscopic image display apparatus using a pair of screen images for the right eye and for the left eye, it is possible to provide a stereoscopic image display apparatus which does not require a viewer to wear glasses having function of separating screen images for the right eye from the screen images for the left eye, and which produces stereoscopic images that can be seen by a large number of viewers at the same time, and can be seen by the viewers while they are changing their positions, and are flicker-less since the provided images are continuous. The present invention greatly contributes to stereoscopic image display apparatus and a stereoscopic endoscope.

As many apparently widely different embodiments of the present invention can be made without departing from the spirit and scope thereof, it is to be understood that the invention is not limited to the specific embodiments thereof except as defined in the appended claims.

What is claimed is:

1. An image display apparatus comprising:
    first image display means for displaying a first image by irradiating light polarized in a first direction;
    second image display means for displaying a second image by irradiating light polarized in a second direction which is different from the first direction;
    combining means for combining the first image and the second image;
    transmission control means, provided between said combining means and a viewer, for controlling the polarized light to be transmitted; and
    optical elements, provided between said transmission control means and the viewer, for giving the transmitted light directivity,
    wherein said transmission control means has two transmission areas which separately transmit the polarized light of the first image and the polarized light of the second image.

2. The image display apparatus according to claim 1, wherein the first direction and the second direction are perpendicular to each other.

3. The image display apparatus according to claim 1, wherein said transmission control means includes:
    a transmission type display device capable of displaying an image; and
    a polarizing plate, provided on one side of the display device which transmits either the first polarized light or the second polarized light.

4. The image display apparatus according to claim 3, wherein said transmission type display device is a monochromatic transmission type liquid crystal display device which transmits either one of the first or the second polarized light when a voltage is applied to the display device, and transmits the other polarized light when a voltage is not applied.

5. The image display apparatus according to claim 3, wherein said transmission type display device has the two transmission areas as display areas on the display thereof, and the display areas are provided so that each display area corresponds to right side and left side of the viewer's face.

6. The image display apparatus according to claim 3, wherein the image display apparatus further comprises an image sensing device for picking up an image of the viewer, wherein said image sensing device takes an image of either right or left side of the viewer's face and the picked-up image is displayed on said transmission type display device.

7. The image display apparatus according to claim 3, further comprising an image sensing device for picking up an image of the viewer, wherein the image sensing device picks up images of either right or left side of the viewer's face, and in the area where the picked-up part of the face is displayed on said transmission type display device, a figure through which area either the first or second polarized light transmits is displayed.

8. The image display apparatus according to claim 3, further comprising a detecting device for detecting a position of the viewer, wherein a figure which transmits either the first or the second polarized light is displayed on the display of said transmission type display device at the position of either the right or the left side of the viewer's face detected by said detecting device.

9. The image display apparatus according to claim 6, further comprising an irradiation device for irradiating infrared, wherein the image sensing device can selectively pick up images in correspondence with a wavelength of the infrared from said irradiation device.

10. The image display apparatus according to claim 1, wherein said combining means is a half mirror.

11. The image display apparatus according to claim 1, wherein said combining means is a screen upon which an image is irradiated from said first image display means and said second image display means.

12. The image display apparatus according to claim 1, wherein said optical element is either a lens or a concave mirror.

13. The image display apparatus according to claim 4, wherein the display of said mono-chromatic transmission type liquid crystal display device is provided beyond a focal distance of the optical element.

14. The image display apparatus according to claim 1, wherein said optical element expands the area, to be seen by the viewer's right eye, corresponding to the right side of the viewer's face in said transmission control means, likewise, expands the area, to be seen by the viewer's left eye, corresponding to the left side of the viewer's face in said transmission control means.

15. The image display apparatus according to claim 1, further comprising a pair of lens mirrors for picking up an object to be seen as a stereoscopic image from the two different directions and a pair of endoscopic barrels having a pair of image sensing elements for converting the pair of object's image into electrical signals, wherein the images picked up by the image sensing elements are displayed on said first and second image display means.

16. The image display apparatus according to claim 8, wherein said detecting device uses ultrasonic having one or more different frequencies to detect the position of the viewer.

17. The image display apparatus according to claim 6, wherein the image sensing device is fixed on the head of the viewer.

18. The image display apparatus according to claim 1, wherein said combining means comprises a beam splitter.

* * * * *

UNITED STATES PATENT AND TRADEMARK OFFICE
CERTIFICATE OF CORRECTION

Page 1 of 3

PATENT NO. : 5,793,341
DATED : August 11, 1998
INVENTOR(S) : Shigeru OMORI et al It is certified that error appears in the above-identified patent and that said Letters Patent is hereby corrected as shown below:

On the title page item [56] insert:

| | | |
|---|---|---|
| -- 4,385,316 | 5/1983 | Yanagisawa |
| 4,647,966 | 3/1987 | Phillips et al. |
| 4,649,425 | 5/1987 | Pund |
| 4,717,949 | 1/1988 | Eichenlaub |
| 4,829,365 | 5/1989 | Eichenlaub |
| 4,870,600 | 9/1989 | Hiraoka |
| 4,890,902 | 1/1990 | Doane et al. |
| 4,992,336 | 5/1990 | Morton |
| 5,008,658 | 4/1991 | Russay et al. |
| 5,059,957 | 10/1991 | Todoriki et al. |
| 5,162,785 | 11/1992 | Fagard |
| 5,311,220 | 5/1994 | Eichenlaub |
| 5,312,839 | 5/1994 | Nakada |
| | | |
| 0 505 998 | 9/1992 | EPO |
| 0 576 106 | 12/1993 | EPO |
| 0 595 023A1 | 5/1994 | EPO |
| 0 601 308 A1 | 6/1994 | EPO |
| 0 602 934 | 6/1994 | EPO |
| 41 02 895C1 | 1/1992 | German |
| 93 00 765 | 5/1993 | German |
| 2 111 798A | 7/1983 | Great Britain |
| 2 206 763 A | 1/1989 | Great Britain |

UNITED STATES PATENT AND TRADEMARK OFFICE
CERTIFICATE OF CORRECTION

PATENT NO. : 5,793,341
DATED : August 11, 1998
INVENTOR(S) : Shigeru OMORI et al It is certified that error appears in the above-identified patent and that said Letters Patent is hereby corrected as shown below:

| | | |
|---|---|---|
| 63-127777 | 5/1988 | Japan |
| 63-194497 | 8/1988 | Japan |
| 5-22722 | 1/1993 | Japan |
| WO83/02169 | 6/1983 | WIPO/PCT |
| WO93/19394 | 10/1993 | WIPO/PCT |

J.R. Moore et al., "The Implementation of a Multi-view Autostereoscopic Display," Image Technology (Journal of the BKSTS), Vol. 75, No. 1, January 1993, London GB, pp. 6-11

K.E. Jachimowicz et al., "Stereoscopic (3-D) Projection Display Using Polarized Color Multiplexing, " Optical Engineering, Vol. 29, No. 8, August 1990, Bellingham, WA, US, pp. 838-842

UNITED STATES PATENT AND TRADEMARK OFFICE
CERTIFICATE OF CORRECTION

PATENT NO. : 5,793,341
DATED : August 11, 1998
INVENTOR(S) : Shigeru Omori et al.

It is certified that error appears in the above-identified patent and that said Letters Patent is hereby corrected as shown below:

K. Yamamoto et al., "Automatic Viewing Range Tracing Method For Communication Equipment", IEEE Transactions on Consumer Electronics, August 1991, No. 3, Vol. 37, pp. 424-431. --.

In Column 19, line 58, delete "display." and insert -- display --.

In Column 20, line 3, delete "pass." and insert -- pass --.

Signed and Sealed this

Eighth Day of June, 1999

*Attest:*

Q. TODD DICKINSON

*Attesting Officer*     Acting Commissioner of Patents and Trademarks